(12) United States Patent
Song et al.

(10) Patent No.: US 11,309,739 B2
(45) Date of Patent: Apr. 19, 2022

(54) WIRELESS POWER TRANSMISSION APPARATUS AND WIRELESS POWER TRANSMISSION METHOD

(71) Applicant: SAMSUNG ELECTRONICS CO., LTD., Suwon-si (KR)

(72) Inventors: Keum Su Song, Seoul (KR); Sang Wook Kwon, Seongnami-si (KR); Ki Young Kim, Yongin-si (KR); Yun Kwon Park, Dongducheon-si (KR); Jae Hyun Park, Pyeongtaek-si (KR); Chi Hyung Ahn, Suwon-si (KR); Young Ho Ryu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/411,756

(22) Filed: May 14, 2019

(65) Prior Publication Data

US 2019/0273399 A1    Sep. 5, 2019

Related U.S. Application Data

(63) Continuation of application No. 14/037,726, filed on Sep. 26, 2013, now Pat. No. 10,298,062.

(30) Foreign Application Priority Data

Jan. 22, 2013   (KR) ........................ 10-2013-0006815

(51) Int. Cl.
*H02J 50/12* (2016.01)
*H02J 50/90* (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02); *H02J 50/90* (2016.02)

(58) Field of Classification Search
CPC .. H02J 50/12; H02J 7/025; H02J 50/90; H02J 50/40; H02J 50/80; H02J 50/402
See application file for complete search history.

(56) References Cited

U.S. PATENT DOCUMENTS 8,810,196 B2   8/2014   Ettes et al.
9,576,626 B2   2/2017   Jang et al.
(Continued)

FOREIGN PATENT DOCUMENTS

JP   2012-65419 A        3/2012
KR   10-2004-0065534 A   7/2004
(Continued)

OTHER PUBLICATIONS

Communication dated Feb. 7, 2019, issued by the Korean Intellectual Property Office in counterpart Korean Patent Application No. 10-2013-0006815.
(Continued)

*Primary Examiner* — Daniel Cavallari
(74) *Attorney, Agent, or Firm* — Sughrue Mion, PLLC

(57) ABSTRACT

A wireless power transmission apparatus includes resonators configured to transmit a power wirelessly to another resonator, and a controller configured to control a current magnitude and/or a voltage magnitude of a power to be provided to each of the resonators. The apparatus further includes a feeder configured to provide the power to each of the resonators.

18 Claims, 19 Drawing Sheets

(51) Int. Cl.
*H02J 7/02* (2016.01)
*H02J 50/80* (2016.01)
*H02J 50/40* (2016.01)

(56) References Cited

U.S. PATENT DOCUMENTS

| | | |
|---|---|---|
| 2005/0068019 A1 | 3/2005 | Nakamura et al. |
| 2009/0195332 A1 | 8/2009 | Joannopoulos et al. |
| 2010/0187913 A1 | 7/2010 | Smith et al. |
| 2010/0237709 A1 | 9/2010 | Hall et al. |
| 2010/0314947 A1 | 12/2010 | Baarman et al. |
| 2011/0018654 A1 | 1/2011 | Bradley et al. |
| 2011/0046438 A1 | 2/2011 | Iwaisako |
| 2011/0140543 A1 | 6/2011 | Ryu et al. |
| 2011/0210621 A1* | 9/2011 | Iwaisako ............ A61B 1/00029 307/104 |
| 2011/0304216 A1 | 12/2011 | Baarman |
| 2012/0043825 A1 | 2/2012 | Urano |
| 2012/0098486 A1 | 4/2012 | Jung |
| 2012/0169134 A1 | 7/2012 | Choudhary et al. |
| 2012/0169137 A1 | 7/2012 | Lisi et al. |
| 2012/0193993 A1 | 8/2012 | Azancot et al. |
| 2012/0212068 A1 | 8/2012 | Urano |
| 2012/0217818 A1 | 8/2012 | Yerazunis et al. |
| 2012/0231731 A1 | 9/2012 | Kim et al. |
| 2012/0248889 A1* | 10/2012 | Fukushi ............ H02J 50/402 307/104 |
| 2013/0082652 A1 | 4/2013 | Jung |
| 2013/0099587 A1 | 4/2013 | Lou et al. |
| 2013/0307346 A1 | 11/2013 | Arisawa et al. |
| 2014/0191819 A1* | 7/2014 | Suzuki ............ H02J 50/90 333/17.3 |
| 2014/0333258 A1 | 11/2014 | Matsukura et al. |

FOREIGN PATENT DOCUMENTS

| | | |
|---|---|---|
| WO | 2010/035321 A1 | 4/2010 |
| WO | 2012/073349 A1 | 6/2012 |
| WO | 2012/169584 A1 | 12/2012 |

OTHER PUBLICATIONS

Extended European Search Report dated Aug. 9, 2016 in counterpart European Application No. 14743911.1.
International Search Report dated Apr. 15, 2014 in the International Application No. PCT/KR2014/000538.

* cited by examiner

WIRELESS POWER TRANSMISSION APPARATUS AND WIRELESS POWER TRANSMISSION METHOD

CROSS-REFERENCE TO RELATED APPLICATION

This application is a continuation application of U.S. application Ser. No. 14/037,726, filed on Sep. 26, 2013, which claims the benefit under 35 USC 119(a) of Korean Patent Application No. 10-2013-0006815, filed on Jan. 22, 2013, in the Korean Intellectual Property Office, the entire disclosure of which is incorporated herein by reference for all purposes.

BACKGROUND

1. Field

The following description relates to an apparatus and a method for transmitting power wirelessly.

2. Description of Related Art

Research on wireless power transmission has been started to overcome an increase in inconveniences of wired power supplies, or the limited capacity of conventional batteries, due to an explosive increase in various electronic devices including electric vehicles and mobile devices. One of wireless power transmission technologies uses resonance characteristics of radio frequency (RF) devices. A wireless power transmission system using resonance characteristics may include a source device configured to supply power, and a target device configured to receive the supplied power.

SUMMARY

In one general aspect, there is provided a wireless power transmission apparatus, including resonators configured to transmit a power wirelessly to another resonator, and a controller configured to control a current magnitude and/or a voltage magnitude of a power to be provided to each of the resonators. The apparatus further includes a feeder configured to provide the power to each of the resonators.

In another general aspect, there is also provided a wireless power transmission apparatus, including resonators configured to transmit a power wirelessly to another resonator, and a controller configured to control a current phase and/or a voltage phase of the power to be provided to each of the resonators. The apparatus further includes a feeder configured to provide the power to each of the resonators.

In still another general aspect, there is also provided a wireless power transmission method, including controlling a current magnitude and/or a voltage magnitude of a power to be provided to each of resonators, and providing the power to each of the resonators. The method further includes transmitting, by the resonators, a power wirelessly to another resonator.

Other features and aspects will be apparent from the following detailed description, the drawings, and the claims.

DETAILED DESCRIPTION

Figure 1:
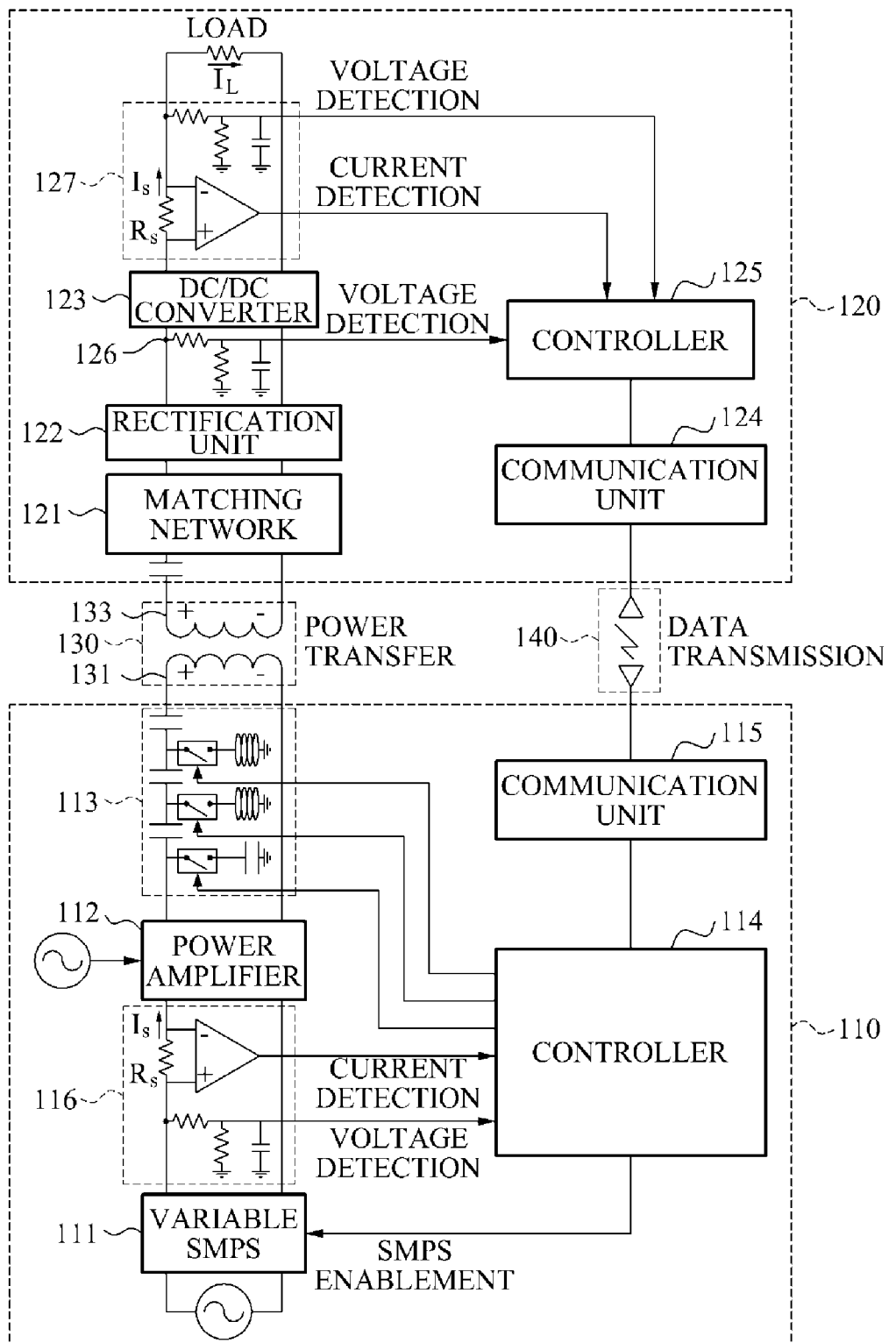
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A scheme of performing communication between a source device and a target device may be an in-band communication scheme, or an out-band communication scheme, or a combination of both. The in-band communication scheme refers to communication performed between the source device and the target device in the same frequency band that is used for power transmission. The out-band communication scheme refers to communication performed between the source device and the target device in a frequency band that is different from a frequency band used for power transmission.

FIG. 1 is a diagram illustrating an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a transmission (TX) controller 114 (e.g., a TX control logic), a communication unit 115, a power detector 116, and a source resonator 131. The target device 120 includes a matching network 121, a rectification unit 122, a direct current-to-direct current (DC/DC) converter 123, a communication unit 124, a reception (RX) controller 125 (e.g., a RX control logic), a power detector 127, and a target resonator 133.

The variable SMPS 111 generates a DC voltage by switching an alternating current (AC) voltage including a frequency of tens of hertz (Hz) output from a power supply. The variable SMPS 111 may output a DC voltage including a predetermined level, or may output a DC voltage including an adjustable level by the controller 114.

The variable SMPS 111 may control supplied voltage based on a level of power output from the power amplifier 112 so that the power amplifier 112 may be operated in a saturation region with high efficiency at all times, and may enable a maximum efficiency to be maintained at all levels of the output power. The power amplifier 112 may include class-E features. For example, when a common SMPS is used instead of the variable SMPS 111, a variable DC-to-DC (DC/DC) converter needs to be additionally used. In this example, the common SMPS and the variable DC/DC converter may control supplied voltage based on the level of the power output from the power amplifier 112 so that the power amplifier 112 may be operated in the saturation region with high efficiency at all times, and may enable the maximum efficiency to be maintained at all levels of the output power.

The power detector 116 detects an output current and an output voltage of the variable SMPS 111, and provides, to the controller 114, information of the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal including a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The controller 114 may detect a reflected wave of the communication power or a reflected wave of the charging power, and may detect mismatching between the target resonator 133 and the source resonator 131 based on the detected reflected wave. The controller 114 may detect the mismatching by detecting an envelope of the reflected wave, or by detecting an amount of a power of the reflected wave.

Under the control of the controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the controller 114 through a switch, which is under the control of the controller 114.

The controller 114 may calculate a voltage standing wave ratio (VSWR) based on a voltage level of the reflected wave and a level of an output voltage of the source resonator 131 or the power amplifier 112. When the VSWR is greater than a predetermined value, the controller 114 detects the mismatching. In this example, the controller 114 calculates a power transmission efficiency of each of N predetermined tracking frequencies, determines a tracking frequency $F_{Best}$ including the best power transmission efficiency among the N predetermined tracking frequencies, and changes the reference resonance frequency $F_{Ref}$ to the tracking frequency $F_{Best}$.

Also, the controller 114 may control a frequency of the switching pulse signal used by the power amplifier 112. By controlling the switching pulse signal used by the power amplifier 112, the controller 114 may generate a modulation signal to be transmitted to the target device 120. In other words, the communication unit 115 may transmit various messages to the target device 120 via in-band communication. Additionally, the controller 114 may detect a reflected wave, and may demodulate a signal received from the target device 120 through an envelope of the reflected wave.

The controller 114 may generate a modulation signal for in-band communication using various schemes. To generate a modulation signal, the controller 114 may turn on or off the switching pulse signal used by the power amplifier 112, or may perform delta-sigma modulation. Additionally, the controller 114 may generate a pulse-width modulation (PWM) signal including a predetermined envelope.

The controller 114 may determine initial wireless power that is to be transmitted to the target device 120 based on a change in a temperature of the source device 110, a battery state of the target device 120, a change in an amount of power received at the target device 120, and/or a change in a temperature of the target device 120.

The source device 110 may further include a temperature measurement sensor (not illustrated) that detects a change in temperature. The source device 110 may receive, from the target device 120, information regarding the battery state of the target device 120, the change in the amount of power received at the target device 120, and/or the change in the temperature of the target device 120, through communication. The source device 110 may detect the change in the temperature of the target device 120 based on the information received from the target device 120.

The controller 114 may adjust voltage supplied to the power amplifier 112, using a lookup table. The lookup table may be used to store an amount of the voltage to be adjusted based on the change in the temperature of the source device 110. For example, when the temperature of the source device 110 rises, the controller 114 may lower an amount of the voltage to be supplied to the power amplifier 112.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication. The target resonator 133 may receive the initial wireless power that is determined based on the change in the temperature of the source device 110, the battery state of the target device 120, the change in the amount of power received at the target device 120, and/or the change in the temperature of the target device 120.

The matching network 121 matches an input impedance viewed from the source device 110 to an output impedance viewed from a load. The matching network 121 may be configured with a combination of a capacitor and an inductor.

The rectification unit 122 generates a DC voltage by rectifying an AC voltage received by the target resonator 133.

The DC/DC converter 123 adjusts a level of the DC voltage output from the rectification unit 122 based on a voltage rating of the load. For example, the DC/DC converter 123 may adjust the level of the DC voltage output from the rectification unit 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the controller 125. The controller 125 uses the detected voltage of the input terminal 126 to compute a transmission efficiency of power received from the source device 110. Additionally, the controller 125 uses the detected current and the detected voltage of the output terminal to compute an amount of power transferred to the load. The controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectification unit 122, or by detecting an output signal of the rectification unit 122. In other words, the controller 125 may demodulate a message received via the in-band communication.

Additionally, the controller 125 may adjust an impedance of the target resonator 133 to modulate a signal to be transmitted to the source device 110. For example, the controller 125 may increase the impedance of the target resonator so that a reflected wave will be detected by the controller 114 of the source device 110. In this example, depending on whether the reflected wave is detected, the controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectification unit 122, an output voltage value and an output current value of the rectification unit 122, or an output voltage value and an output current value of the DC/DC converter 123.

Figure 2:
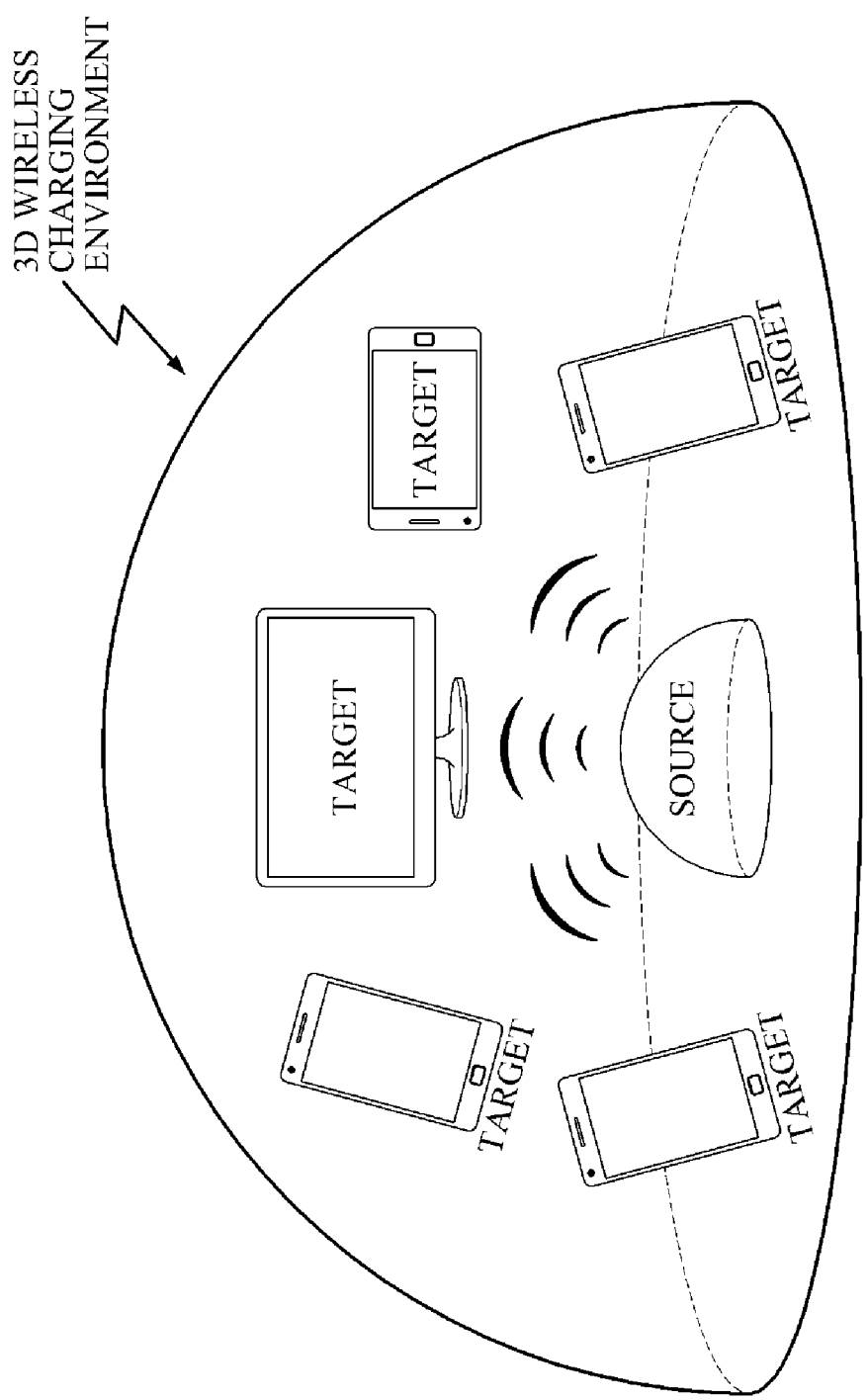
FIG. 2 is a diagram illustrating an example of a wireless charging environment for a wireless power transmission apparatus.

FIG. 2 is a diagram illustrating an example of a wireless charging environment for a wireless power transmission apparatus. Referring to FIG. 2, a three-dimensional (3D) wireless charging environment is shown, in which power transmission from a single source device to target devices disposed at various locations and directions is performed. In the 3D wireless charging environment, a target device may need to be charged with an efficiency greater than or equal to a predetermined efficiency although the target device is disposed at a random distance and a random direction, other than a predetermined distance and a predetermined direction, from the source device.

Figure 3:
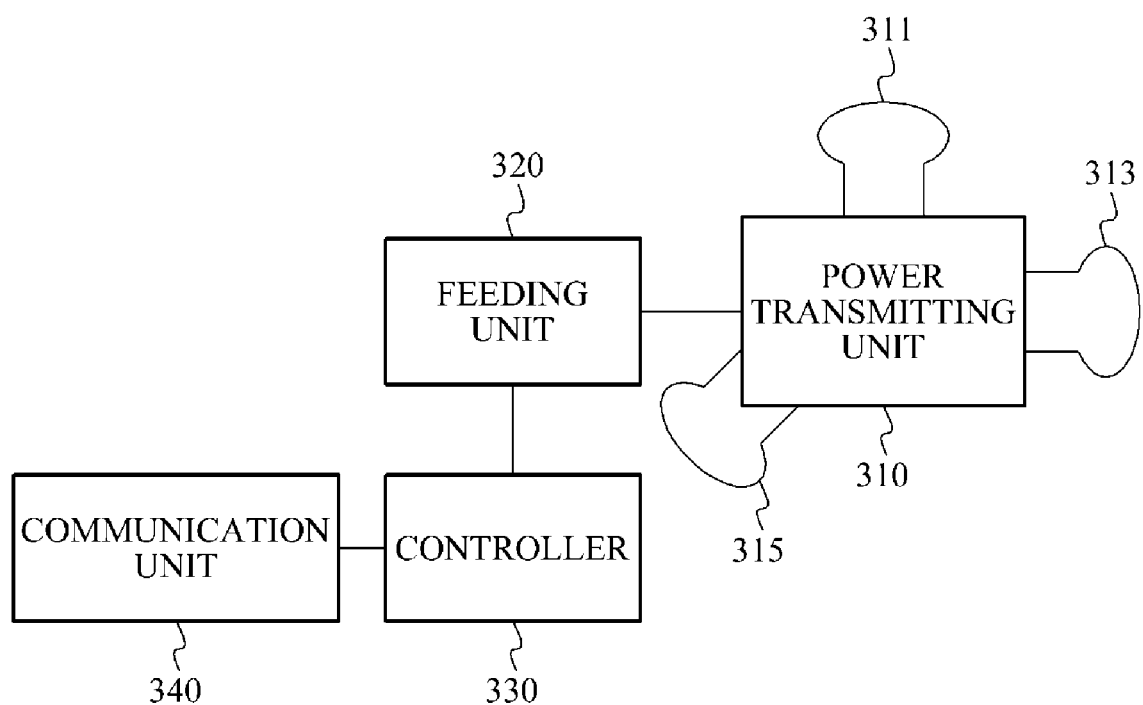
FIG. 3 is a block diagram illustrating an example of a wireless power transmission apparatus.

FIG. 3 is a block diagram illustrating an example of a wireless power transmission apparatus. Referring to FIG. 3, the wireless power transmission apparatus includes a power transmitting unit 310, a feeding unit 320 (e.g., a feeder), a controller 330, and a communication unit 340.

Figure 6:
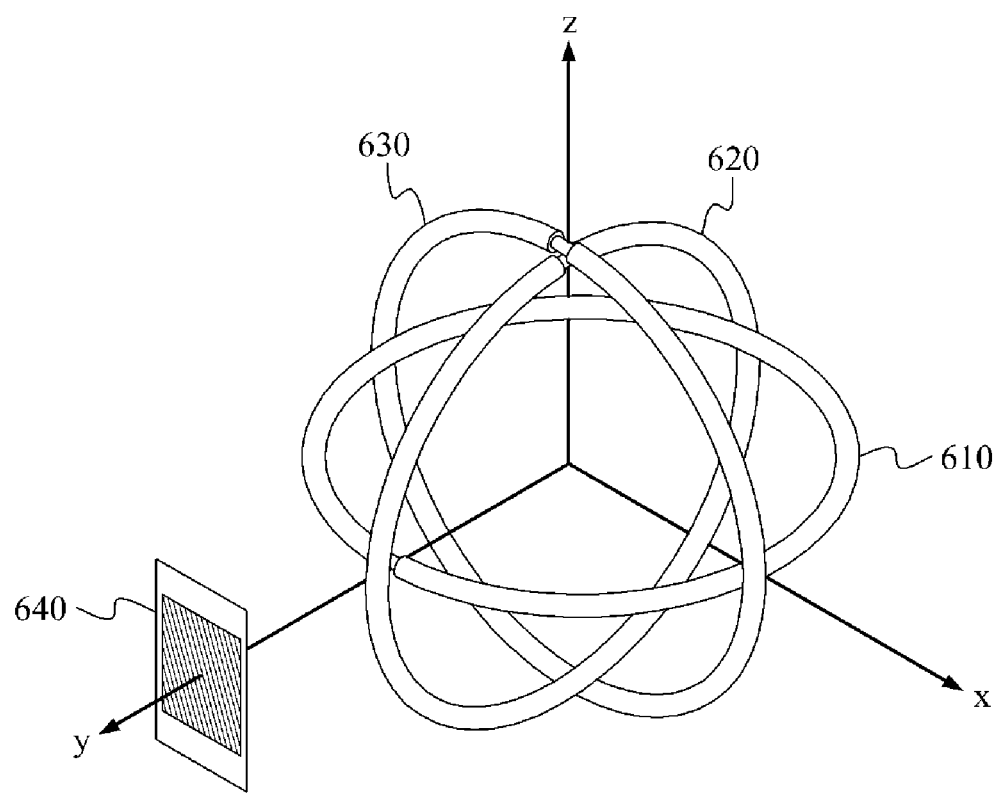
FIG. 6 is a diagram illustrating an example of a target device and a structure of resonators of a wireless power transmission apparatus.
Figure 7:
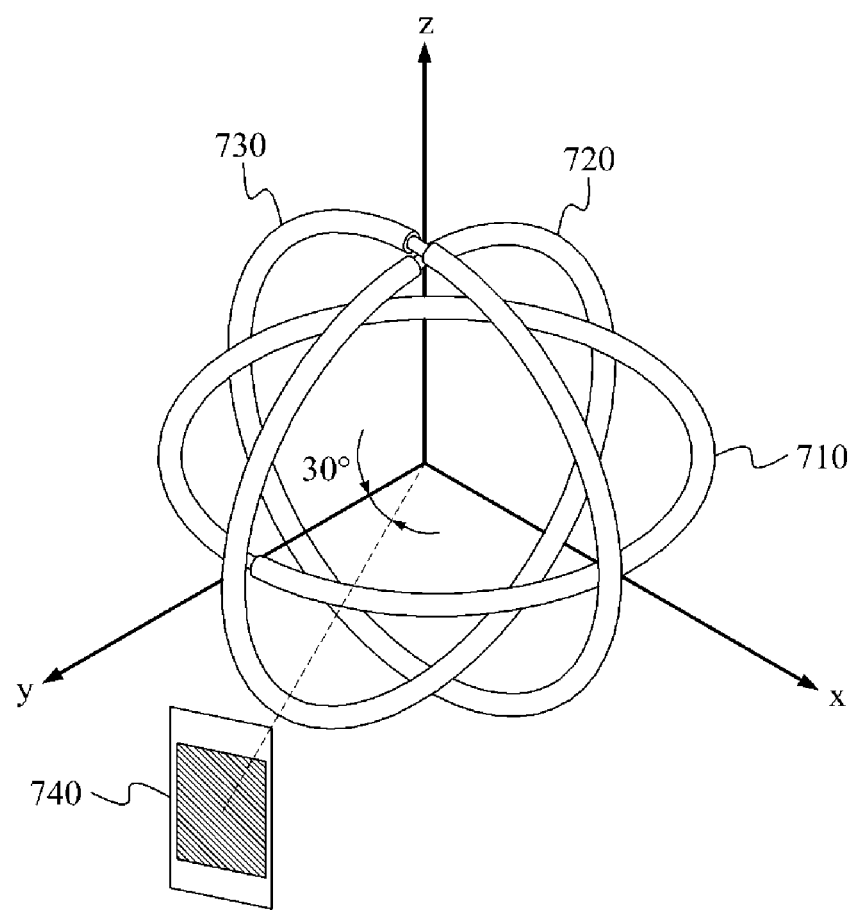
FIG. 7 is a diagram illustrating another example of a target device and a structure of resonators of a wireless power transmission apparatus.
Figure 10:
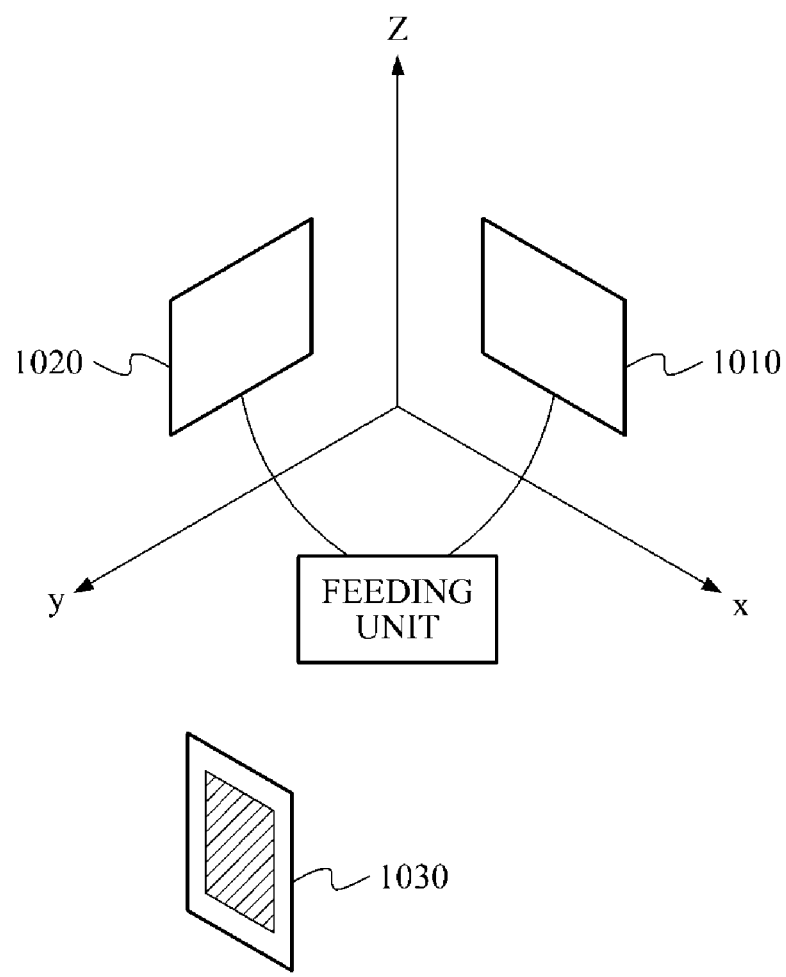
FIG. 10 is a diagram illustrating an example of a target device and an arrangement of resonators of a wireless power transmission apparatus.

The power transmitting unit 310 includes source resonators 311, 313, and 315 that transmit a power wirelessly to a target resonator (e.g., the target resonator 133 of FIG. 1) via magnetic coupling between the target resonator and the source resonators 311, 313, and 315. Although three source resonators are illustrated in FIG. 3, a number of source resonators is not limited thereto. At least two source resonators may be included in the power transmitting unit 310. The source resonators 311, 313, and 315 may be arranged in a coupled form or a separated form. An example of the coupled form is illustrated in FIGS. 6 and 7, and an example of the separated form is illustrated in FIG. 10.

The feeding unit 320 provides a power to each of the source resonators 311, 313, and 315. The feeding unit 320 may transfer, to the each of the source resonators 311, 313, and 315, a power supplied from a power supply.

The controller 330 controls a current magnitude and/or a voltage magnitude of the power to be provided by the feeding unit 320. The controller 330 may control a current magnitude and/or a voltage magnitude of the power supplied from the power supply. The controlled power may be supplied from the power supply to the feeding unit 320, and the feeding unit 320 may transfer the supplied power to each of the source resonators 311, 313, and 315.

Figure 5:
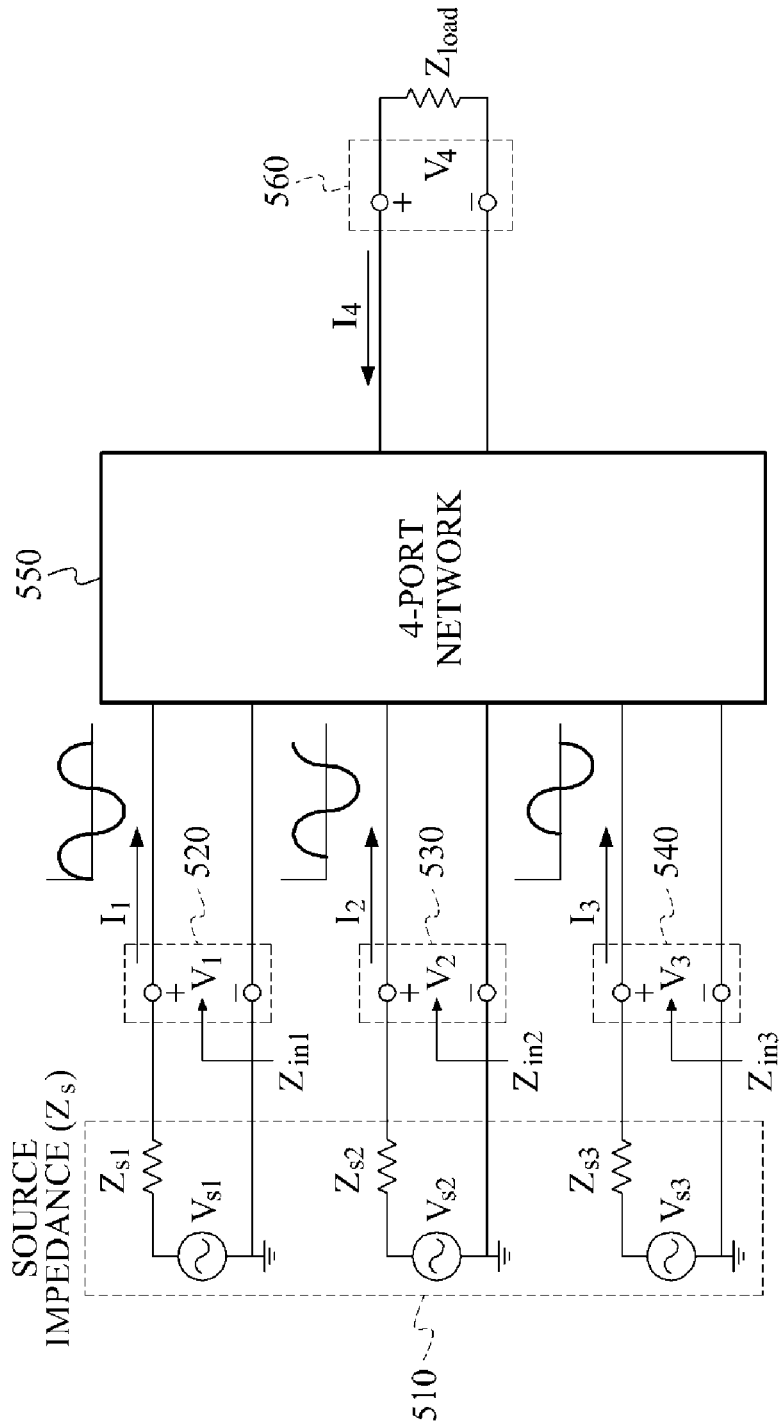
FIG. 5 is a diagram illustrating an example of an N-port network of a wireless power transmission apparatus.

For example, the controller 330 may calculate an impedance parameter of an N-port network (e.g., as shown in FIG. 5) between the target resonator connected to an output end of the N-port network and the source resonators 311, 313, and 315 connected to respective input ends of the N-port network. The impedance parameter may include parameters indicating various relationships between the output and the input ends of the N-port network, for example, a Z-parameter, an h-parameter, an a-parameter, a b-parameter, and/or other parameters known to one of ordinary skill in the art. The N-port network will be described in detail with reference to FIG. 5. The controller 330 may control the current magnitude and/or the voltage magnitude of the power to be provided to each of the source resonators 311, 313, and 315 based on the calculated impedance parameter.

The communication unit 340 may receive, from a wireless power reception apparatus (e.g., the target device 120 of FIG. 1), information of a voltage and/or a current that are applied to a load of the wireless power reception apparatus when a test voltage and a test current are applied to the source resonators 311, 313, and 315. The communication unit 340 may receive, from the wireless power reception apparatus, information of a power received at the wireless power reception apparatus when a test power is applied to the source resonators 311, 313, and 315. The information of the power received may include information of a current and/or a voltage that are received at the wireless power reception apparatus. The communication unit 340 may communicate with the wireless power reception apparatus, using an in-band communication scheme and/or an out-band communication scheme.

For example, the controller 330 may control the current magnitude and/or the voltage magnitude of the power to be provided to each of the source resonators 311, 313, and 315 based on an efficiency of a power transmission to the target resonator. The controller 330 may calculate the power transmission efficiency based on the information of the power received at the wireless power reception apparatus. The information of the power may be received from the wireless power reception apparatus through the communication unit 340.

In another example, the controller 330 may control the current magnitude and/or the voltage magnitude of the power to be provided to each of the source resonators 311, 313, and 315 in order to satisfy a predetermined power transmission efficiency, e.g., a desired value of the power transmission efficiency. For example, if the power transmission efficiency is preset to 80%, the controller 330 may control the current magnitude and/or the voltage magnitude in order to satisfy the power transmission efficiency of 80%. In this example, the controller 330 may control the power at different current magnitudes and/or different voltage magnitudes to be provided to each of the source resonators 311, 313, and 315 or may control the power at identical current magnitudes and/or identical voltage magnitudes to be provided to each of the source resonators 311, 313, and 315.

The controller 330 controls a current phase and/or a voltage phase of the power to be provided by the feeding unit 320. The controller 330 may control the current phase and/or the voltage phase of the power to be provided to each of the source resonators 311, 313, and 315, based on the efficiency of the power transmission to the target resonator. For example, the controller 330 may control the current phase and/or the voltage phase in order to satisfy the predetermined power transmission efficiency. In another example, the controller 330 may control the current phase and/or the voltage phase based on the calculated impedance parameter.

In more detail, each time the current magnitude and/or the voltage magnitude is controlled, the controller 330 may receive, from the communication unit 340, the information of the power received at the wireless power reception apparatus, calculate the power transmission efficiency based on the information of the power received, and compare the calculated power transmission efficiency to the predetermined power transmission efficiency. When the calculated power transmission efficiency satisfies (e.g., is greater than or equal to) the predetermined power transmission efficiency, the controller 330 may determine the current magnitude and/or the voltage magnitude to be an optimal current magnitude and/or an optimal voltage magnitude of an optimal power to be provided to each of the source resonators 311, 313, and 315. Otherwise, the controller 330 may adjust the current magnitude and/or the voltage magnitude.

Each time the current phase and/or the voltage phase is controlled, the controller 330 may receive, from the communication unit 340, the information of the power received at the wireless power reception apparatus, calculate the power transmission efficiency based on the information of the power received, and compare the power transmission efficiency to the predetermined power transmission efficiency. When the calculated power transmission efficiency satisfies (e.g., is greater than or equal to) the predetermined power transmission efficiency, the controller 330 may determine the current phase and/or the voltage phase to be an optimal current phase and/or an optimal voltage phase of an optimal power to be provided to each of the source resonators 311, 313, and 315. Otherwise, the controller 330 may adjust the current phase and/or the voltage phase.

The controller 330 may estimate the optimal current magnitude and/or the optimal voltage magnitude, by performing a simulation within an adjustable range of the current magnitude and/or the voltage magnitude for each of the source resonators 311, 313, and 315. The simulation may correspond to a software measurement, and be performed using an optimization algorithm and an optimization tool. The controller 330 may determine the current magnitude and/or the voltage magnitude used in the simulation to be the optimal current magnitude and/or the optimal voltage magnitude. The controller 330 may further estimate the optimal current phase and/or the optimal voltage phase, by performing the simulation within an adjustable range of the current phase and/or the voltage phase for each of the source resonators 311, 313, and 315.

Although not shown in FIG. 3, each of the source resonators 311, 313, and 315 may include a first transmission line, a first conductor, a second conductor, and a first capacitor. The first transmission line may include a first signal conducting portion, a second signal conducting portion, and a first ground conducting portion corresponding to the first signal conducting portion and the second signal conducting portion. The first conductor may electrically connect the first signal conducting portion to the first ground conducting portion. The second conductor may be spaced from the first ground conducting portion, and may be electrically connected to the second signal conducting portion. The first capacitor may be inserted in series between the first signal conducting portion and the second signal conducting portion, with respect to a current flowing through the first signal conducting portion and the second signal conducting portion. For example, each of the source resonators 311, 313, and 315 may be provided in a structure illustrated in FIGS. 14A and 14B.

Figure 4:
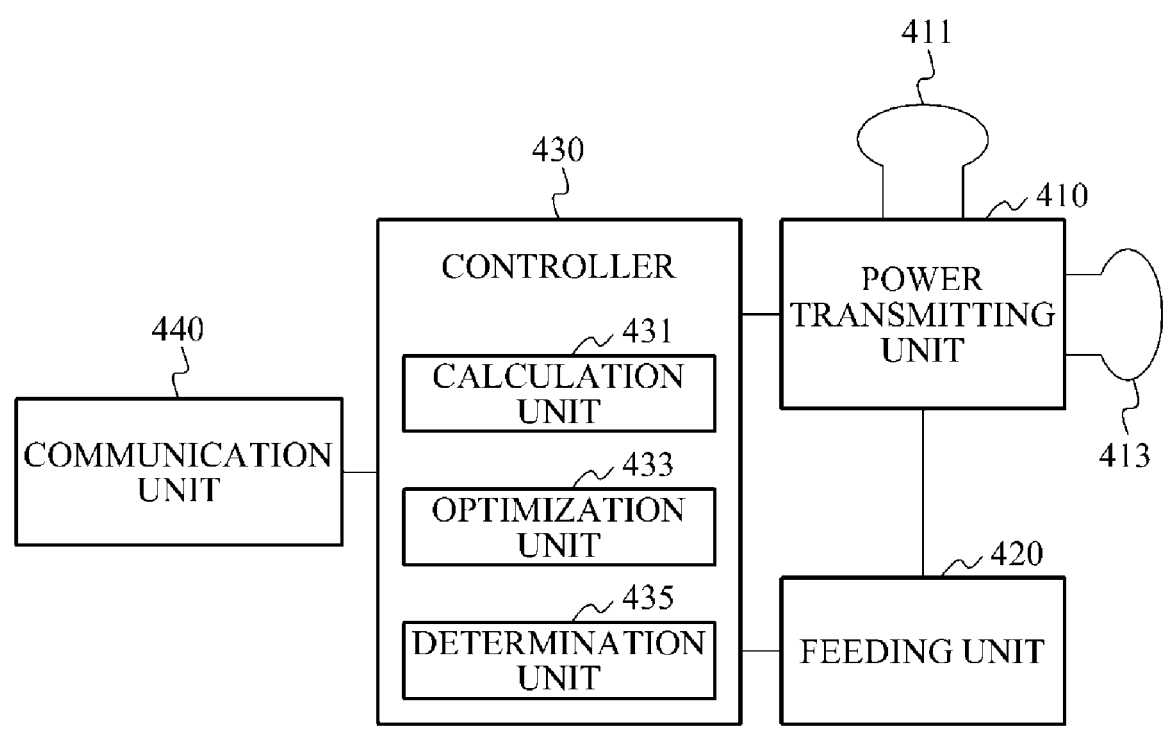
FIG. 4 is a block diagram illustrating another example of a wireless power transmission apparatus.

FIG. 4 is a block diagram illustrating another example of a wireless power transmission apparatus. Referring to FIG. 4, the wireless power transmission apparatus includes a power transmitting unit 410, a feeding unit 420 (e.g., a feeder), a controller 430, and a communication unit 440.

The power transmitting unit 410 includes source resonators 411 and 413 that transmit a power wirelessly to a target resonator (e.g., the target resonator 133 of FIG. 1) via magnetic coupling between the target resonator and the source resonators 411 and 413. Although two source resonators are illustrated in FIG. 4, a number of source resonators is not limited thereto. At least two source resonators may be included in the power transmitting unit 410. The source resonators 411 and 413 may be arranged in a coupled form or a separated form. An example of the coupled form is illustrated in FIGS. 6 and 7, and an example of the separated form is illustrated in FIG. 10.

The feeding unit 420 provides a power to each of the source resonators 411 and 413. The feeding unit 420 may transfer, to each of the source resonators 411 and 413, a power supplied from a power supply.

The controller 430 controls a current magnitude and/or a voltage magnitude of the power to be provided by the feeding unit 420. The controller 430 may control a current magnitude and/or a voltage magnitude of the power supplied from the power supply. The controlled power may be supplied from the power supply to the feeding unit 420, and the feeding unit 420 may transfer the supplied power to each of the source resonators 411 and 413.

For example, the controller 430 may calculate an impedance parameter of an N-port network (e.g., as shown in FIG. 5) between the target resonator connected to an output end of the N-port network and the source resonators 411 and 413 connected to respective input ends of the N-port network. The impedance parameter may include parameters indicating various relationships between the output and the input ends of the N-port network, for example, a Z-parameter, an h-parameter, an a-parameter, a b-parameter, and/or other parameters known to one of ordinary skill in the art. The N-port network will be described in detail with reference to FIG. 5. The controller 430 may control the current magnitude and/or the voltage magnitude of the power to be provided to each of the source resonators 411 and 413 based on the calculated impedance parameter.

The communication unit 440 may receive, from a wireless power reception apparatus (e.g., the target device 120 of FIG. 1), information of a voltage and/or a current applied to a load of the wireless power reception apparatus when a test voltage and a test current are applied to the source resonators 411 and 413. The communication unit 440 may receive, from the wireless power reception apparatus, information of a power received at the wireless power reception apparatus when a test power is applied to the source resonators 411 and 413. The information of the power received may include information of a current and/or a voltage that are received at the wireless power reception apparatus. The communication unit 440 may communicate with the wireless power reception apparatus, using an in-band communication scheme and/or an out-band communication scheme.

The controller 430 includes a calculation unit 431, an optimization unit 433, and a determination unit 435. The calculation unit 431 calculates the impedance parameter of the N-port network, and an efficiency of a power transmission to the target resonator, based on the information of the current and/or the voltage that are received at the wireless power reception apparatus. The information of the current and/or the voltage may be received from the wireless power reception apparatus through the communication unit 440. The power transmission efficiency may be calculated by comparing (e.g., determining a ratio of) the power received at the wireless power reception apparatus to the power transmitted by the power transmitting unit 410. The calculation unit 431 may calculate the received power based on the information of the current and/or the voltage that is received from the wireless power reception apparatus through the communication unit 440. The impedance parameter may be calculated by applying a condition needed for calculation to the input ends and the output end of the N-port network, for each impedance parameter.

The optimization unit 433 may optimize the impedance parameter calculated by the calculation unit 431 based on a predetermined power transmission efficiency, e.g., a desired value of the power transmission efficiency. When the impedance parameter is calculated, the optimization unit 433 may estimate an optimal current magnitude, an optimal voltage magnitude, an optimal current phase, and/or an optimal voltage phase of when the power transmission efficiency satisfies the predetermined power transmission efficiency. Also, the optimization unit 433 may estimate at least two of the optimal current magnitude, optimal the voltage magnitude, the optimal current phase, and the optimal voltage phase of when the power transmission efficiency satisfies the predetermined power transmission efficiency.

To estimate the optimal values, for example, the optimization unit 433 may optimize the impedance parameter, by changing the current magnitude and/or the voltage magnitude of the power to be provided to each of the source resonators 411 and 413, sequentially, in a range of the current magnitude and/or the voltage magnitude that is applicable by the feeding unit 420. In another example, the optimization unit 433 may optimize the impedance parameter, by executing an optimization algorithm based on the impedance parameter and the predetermined power transmission efficiency. In this example, the optimization algorithm changes the current magnitude and/or the voltage magnitude, sequentially, in the applicable range of the current magnitude and/or the voltage magnitude. In still another example, the optimization unit 433 may optimize the impedance parameter, by changing the current magnitude and/or the voltage magnitude of the power to be provided to each of the source resonators 411 and 413, randomly, in the range of the current magnitude and/or the voltage magnitude that is applicable by the feeding unit 420.

In yet another example, the optimization unit 433 may optimize the impedance parameter, by changing the current magnitude and/or the voltage magnitude of the power to be provided to each of the source resonators 411 and 413 based on a lookup table, in the range of the current magnitude and/or the voltage magnitude that is applicable by the feeding unit 420. The lookup table may include a current magnitude, a voltage magnitude, a current phase, and a voltage phase that are matched statistically for each power transmission efficiency. Also, the lookup table may include statistic data for examples in which conditions for power distribution and/or other conditions known to one of ordinary skill in the art are satisfied.

The optimization unit 433 may estimate the optimal current magnitude and/or the optimal voltage magnitude of when the power transmission efficiency satisfies the predetermined power transmission efficiency, based on the impedance parameter and an N-port matrix relational expression induced in the N-port network. As conditions of the optimization algorithm, the N-port matrix relation expression, the impedance parameter, and the predetermined power transmission efficiency may be used.

The determination unit 435 determines the current magnitude, the voltage magnitude, the current phase, and/or the voltage phase of the power to be provided to each of the source resonators 411 and 413 based on (e.g., to be) a result of the optimizing. For example, the result of the optimizing may include the optimal current magnitude, the optimal voltage magnitude, the optimal current phase, and/or the optimal voltage phase of when the power transmission efficiency satisfies the predetermined power transmission efficiency.

For example, the controller 430 may control the current magnitude and/or the voltage magnitude of the power to be provided to each of the source resonators 411 and 413 based on the power transmission efficiency. In another example, the controller 430 may control the current magnitude and/or the voltage magnitude in order to satisfy the predetermined power transmission efficiency. In this example, if the predetermined power transmission efficiency is preset to 80%, the controller 430 may control the current magnitude and/or the voltage magnitude in order to satisfy the predetermined power transmission efficiency of 80%. In this example, the controller 430 may control the power at different current magnitudes or different voltage magnitudes, or may control the power at identical current magnitudes or identical voltage magnitudes.

The controller 430 controls the current phase and/or the voltage phase of the power to be provided by the feeding unit 420. The controller 430 may control the current phase and/or the voltage phase based on the power transmission efficiency. For example, the controller 430 may control the current phase and/or the voltage phase in order to satisfy the predetermined power transmission efficiency.

FIG. 5 is a diagram illustrating an example of an N-port network of a wireless power transmission apparatus. In FIG. 5, the N-port network is for an example in which three source resonators and a single target resonator are provided. A value of N of the N-port network may be determined based on a number of input ends and a number of output ends. When the three source resonators are connected to respective input ends of the N-port network, and the single target resonator is connected to an output end of the N-port network, a 4-port network 550 is formed.

Referring to FIG. 5, the wireless power transmission apparatus includes a power source 510, and the three source resonators disposed at a first port 520, a second port 530, and a third port 540, respectively. The power source 510 provides a power to each of the source resonators. The power source 510 is disposed at each of ports $V_{s1}$, $V_{s2}$, and $V_{s3}$. $Z_{s1}$ denotes an impedance of $V_{s1}$, $Z_{s2}$ denotes an impedance of $V_{s2}$, and $Z_{s3}$ denotes an impedance of $V_{s3}$.

A wireless power reception apparatus includes a target resonator disposed at a fourth port 560, and a load. $V_4$ denotes a voltage applied to the target resonator and the load, $I_4$ denotes a current output from the target resonator, and $Z_{load}$ denotes an impedance of the load.

$V_1$ denotes a voltage applied to the first port 520, $I_1$ denotes an output current, and $Z_{in1}$ denotes an input impedance of the first port 520. $V_2$ denotes a voltage applied to the second port 530, $I_2$ denotes an output current, and $Z_{in2}$ denotes an input impedance of the second port 530. $V_3$ denotes a voltage applied to the third port 540, $I_3$ denotes an output current, and $Z_{in3}$ denotes an input impedance of the third port 540.

The input ends and the output end of the 4-port network 550 may be expressed as a 4-port matrix relational expression using an impedance parameter. For example, when Z denotes the impedance parameter, the 4-port matrix relational expression may be arranged, as given by the following example of Equation 1:

$$\begin{bmatrix} Z_{11} & Z_{12} & Z_{13} & Z_{14} \\ Z_{21} & Z_{22} & Z_{23} & Z_{24} \\ Z_{31} & Z_{32} & Z_{33} & Z_{34} \\ Z_{41} & Z_{42} & Z_{43} & Z_{44} \end{bmatrix} \begin{bmatrix} I_1 \\ I_2 \\ I_3 \\ I_4 \end{bmatrix} = \begin{bmatrix} V_1 = \frac{Z_{in1}}{Z_{s1} + Z_{in1}} V_{s1} \\ V_2 = \frac{Z_{in2}}{Z_{s2} + Z_{in2}} V_{s2} \\ V_3 = \frac{Z_{in3}}{Z_{s3} + Z_{in3}} V_{s3} \\ V_4 = -I_4 Z_{load} \end{bmatrix} \quad (1)$$

Using Equation 1, a power transmission efficiency may be calculated, as given by the following example of Equation 2:

$$\text{efficiency} = \frac{P_{L,4}}{P_{avs,1} + P_{avs,2} + P_{avs,3}} = 4 \frac{\text{real}(Z_{load})|I_4|^2}{\frac{|V_{s1}|^2}{\text{real}(Z_{s1})} + \frac{|V_{s2}|^2}{\text{real}(Z_{s2})} + \frac{|V_{s3}|^2}{\text{real}(Z_{s3})}} \quad (2)$$

In Equation 2, $P_{avs}$ denotes a power provided to each of the source resonators, and $P_L$ denotes a power transferred to the load. Referring to Equation 2, it may be understood that the power transmission efficiency may be affected by an absolute value of the current $I_4$ flowing through the load, and an absolute value of the voltage $V_{s1}$, $V_{s2}$, or $V_{s3}$ provided to each of the source resonators.

When a test power is provided by the power source 510, the impedance parameter Z may be calculated. Using the calculated impedance parameter Z, $I_4$ may be expressed using a relational expression of $V_{s1}$, $V_{s2}$, and $V_{s3}$. Consequently, the power transmission efficiency may be affected by the absolute value of the voltage $V_{s1}$, $V_{s2}$, or $V_{s3}$ provided to each of the source resonators. The absolute value of the voltage $V_{s1}$, $V_{s2}$, or $V_{s3}$ may be determined based on a magnitude and a phase of the voltage. Accordingly, the wireless power transmission apparatus may adjust the magnitude and the phase of the voltage provided to each of the source resonators, thereby adjusting the power transmission efficiency.

A power to be provided to each of the source resonators may be affected by a magnitude and a phase of a current flowing through each of the source resonators. The wireless power transmission apparatus may adjust the magnitude and the phase of the current flowing through each of the source resonators, thereby adjusting the power transmission efficiency. In addition, the wireless power transmission apparatus may adjust the magnitude and/or the phase of the current and/or the voltage that are applied to each of the source resonators, thereby maintaining the power transmission efficiency in a complex environment, such as, for example, a 3D wireless charging environment.

FIG. 6 is a diagram illustrating an example of a target device 640 and a structure of resonators 610, 620, and 630 of a wireless power transmission apparatus. Referring to FIG. 6, a power transmitting unit of the wireless power transmission apparatus includes the source resonators 610, 620, and 630. The source resonator 610 includes a surface parallel to an xy plane, the source resonator 620 includes a surface parallel to a yz plane, and the source resonator 630 includes a surface parallel to a zx plane. The source resonator 610, the source resonator 620, and the source resonator 630 are arranged in a coupled form, e.g., are physically-coupled to each other.

The target device 640 receives a power wirelessly from the wireless power transmission apparatus via magnetic coupling between the target device 640 and the source resonators 610, 620, and 630. The target device 640 may form an angle of 0 degrees with the source resonators 610, 620, and 630 at a location of the target device 640. That is, the target device 640 is disposed to face the source resonator 630. By adjusting a current magnitude, a current phase, a voltage magnitude, and/or a voltage phase of a power to be provided to each of the source resonators 610, 620, and 630, an efficiency of a power transmission to the target device 640 may be maintained to be greater than or equal to a predetermined power transmission efficiency even if the location of the target device 640 is changed.

Although three source resonators 610, 620, and 630 are provided in FIG. 6, all examples of at least two resonators being provided may be applicable. In addition, when a plurality of target devices is provided, power distribution for each of the target device may be adjusted by adjusting a current magnitude, a current phase, a voltage magnitude, and/or a voltage phase of a power to be provided to each of the source resonators.

FIG. 7 is a diagram illustrating another example of a target device 740 and a structure of resonators 710, 720, and 730 of a wireless power transmission apparatus. Referring to FIG. 7, a power transmitting unit of the wireless power transmission apparatus includes the source resonators 710, 720, and 730 in the same configuration as FIG. 6.

The target device 740 receives a power wirelessly from the wireless power transmission apparatus via magnetic coupling between the target device 740 and the source resonators 710, 720, and 730. The target device 740 is disposed to form an angle of 30 degrees with the source resonators 710, 720, and 730 at a location of the target device 740. Similar to the example of FIG. 6, an efficiency of a power transmission to the target device 740 may be maintained by adjusting a current magnitude, a current phase, a voltage magnitude, and/or a voltage phase of a power to be provided to each of the source resonators 710, 720, and 730.

Figure 8:
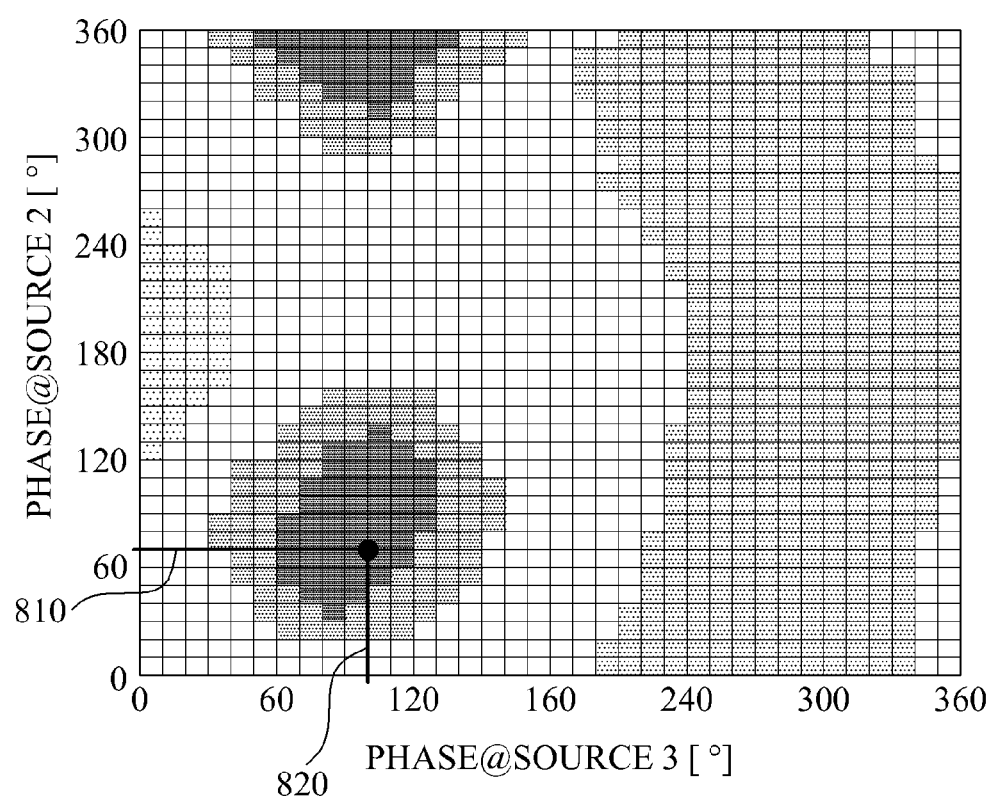
FIGS. 8 and 9 are graphs illustrating examples of a wireless power transmission efficiency according to a voltage phase of a power to be provided to a resonator by a wireless power transmission apparatus.
Figure 9:
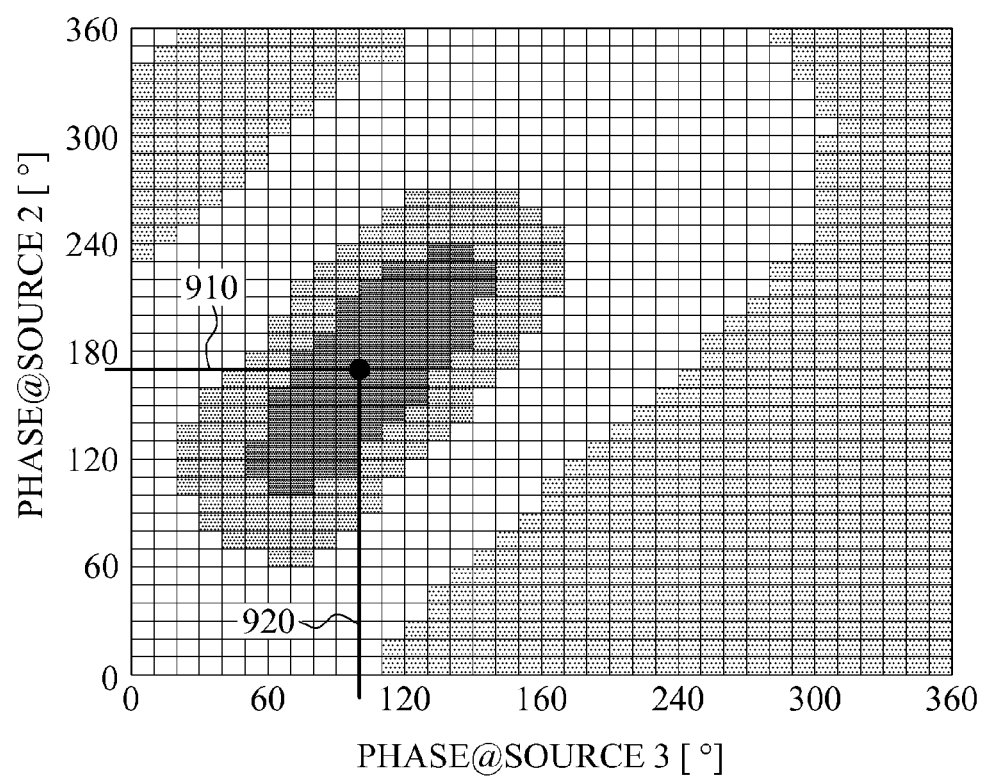

FIGS. 8 and 9 are graphs illustrating examples of a wireless power transmission efficiency according to a voltage phase of a power to be provided to a resonator by a wireless power transmission apparatus. In more detail, FIG. 8 is a graph of an efficiency of a power transmission from the source resonators 610, 620, and 630 to the target device 640, in the example of FIG. 6. In this example, a voltage magnitude of a power to be provided to each of the source resonators 610, 620, and 630 is identical, and a voltage phase of the power to be provided to each of the source resonators 620 and 630 (e.g., sources 2 and 3) is changed. The graph of FIG. 8 may be generated through a simulation of changing the voltage phase of the power to be provided to each of the source resonators 620 and 630.

As the voltage phase of the power to be provided to each of the source resonators 620 and 630, is changed, the power transmission efficiency is changed. In the graph of FIG. 8, the lower a brightness, the higher the power transmission efficiency. It may be estimated that the power transmission efficiency may be at a maximum when the voltage phase 810 of the power to be provided to the source resonator 620 is 70 degrees, and the voltage phase 820 of the of the power to be provided to the source resonator 630 is 100 degrees.

Although FIG. 8 illustrates the graph for the example in which the voltage phase of the power to be provided to each of two source resonators, is changed, a graph may be generated through a simulation for an example in which a voltage phase of a power to be provided to each of the three source resonators is changed, an example in which a voltage magnitude of the power to be provided to each of the three source resonators is changed, and/or an example in which the voltage phase and the voltage magnitude of the power to be provided to each of the three source resonators is changed.

In more detail, FIG. 9 is a graph of an efficiency of a power transmission from the source resonators 710, 720, and 730 to the target device 740, in the example of FIG. 7. In this example, a voltage magnitude of a power to be provided to each of the source resonators 710, 720, and 730 is identical, and a voltage phase of the power to be provided to each of the source resonators 720 and 730 (e.g., sources 2 and 3) is changed.

As the voltage phase of the power to be provided to each of the source resonators 720 and 730, is changed, the power transmission efficiency is changed. In the graph of FIG. 9, the lower a brightness, the higher the power transmission efficiency. It may be estimated that the power transmission efficiency may be at a maximum when the voltage phase 910 of the power to be provided to the source resonator 720 is 170 degrees, and the voltage phase 920 of the power to be provided to the source resonator 730 is 100 degrees.

FIG. 10 is a diagram illustrating an example of a target device 1030 and an arrangement of resonators 1010 and 1020 of a wireless power transmission apparatus. Referring to FIG. 10, the source resonators 1010 and 1020 are arranged in a separated form (e.g., are separated from each other), rather than a coupled form, even though the source resonators 1010 and 1020 receive a power provided from a feeding unit.

The target device 1030 receives a power wirelessly from the wireless power transmission apparatus via magnetic coupling between the target device 1030 and the source resonators 1010 and 1020. By adjusting a current magnitude, a voltage magnitude, a current phase, and/or a voltage phase of the power to be provided from the feeding unit to each of the source resonators 1010 and 1020, an efficiency of a power transmission to the target device 1030 may be maintained to be greater than or equal to a predetermined power transmission efficiency satisfying conditions needed to charge the target device 1030.

Figure 11:
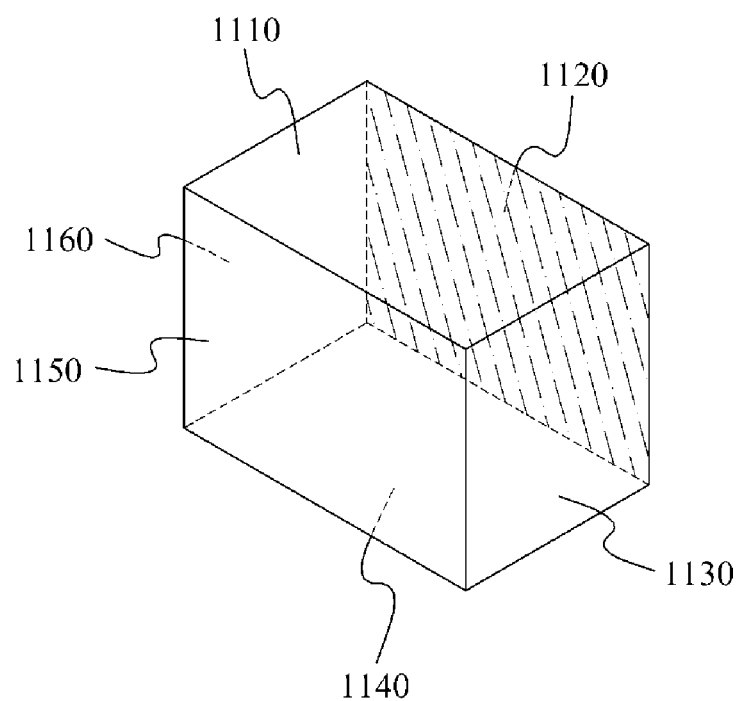
FIG. 11 is a diagram illustrating an example of a structure of a resonator of a wireless power transmission apparatus.

FIG. 11 is a diagram illustrating an example of a structure of a resonator of a wireless power transmission apparatus. Referring to FIG. 11, the source resonator of the wireless power transmission apparatus is a hexahedron. The source resonator includes source resonators 1110 through 1160. The resonator 1110 includes a surface parallel to a surface of the resonator 1140, the resonator 1120 includes a surface parallel to a surface of the resonator 1150, and the resonator 1130 includes a surface parallel to a surface of the resonator 1160.

Figure 12:
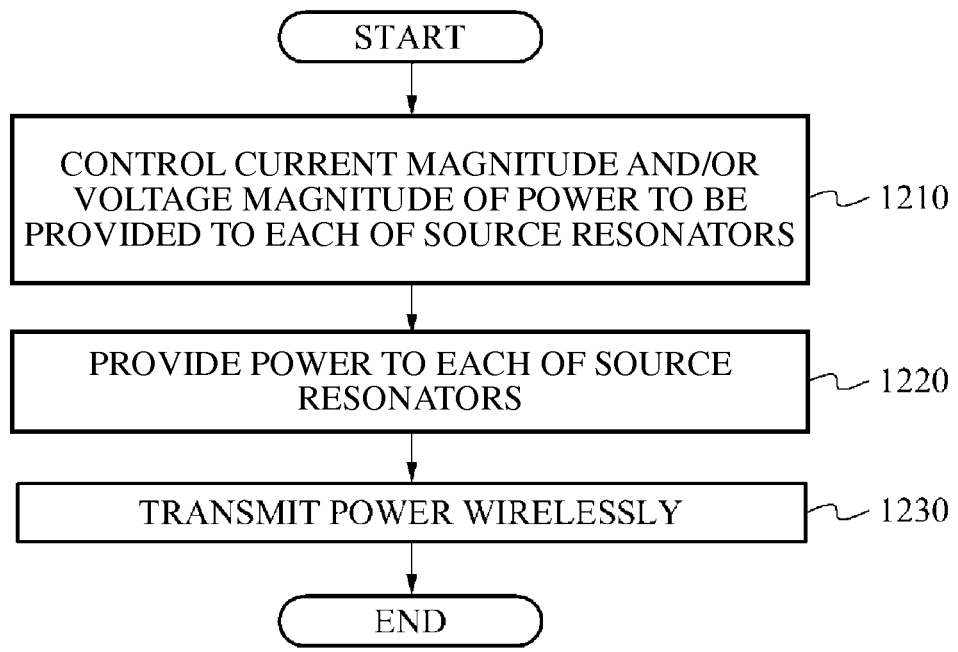
FIG. 12 is a flowchart illustrating an example of a wireless power transmission method.

FIG. 12 is a flowchart illustrating an example of a wireless power transmission method. Referring to FIG. 12, in operation 1210, a wireless power transmission apparatus controls a current magnitude and/or a voltage magnitude of a power to be provided to each of source resonators. For example, the wireless power transmission apparatus may control the current magnitude, the voltage magnitude, a current phase, and/or a voltage phase of the power to be supplied to each of the source resonators based on an efficiency of a power transmission to a target resonator of a wireless power reception apparatus.

In another example, the wireless power transmission apparatus may calculate an impedance parameter of an N-port network between the target resonator connected to an output end of the N-port network and the source resonators connected to respective input ends of the N-port network. The wireless power transmission apparatus may control the current magnitude and/or the voltage magnitude of the power to be provided to each of the source resonators based on the calculated impedance parameter.

In still another example, the wireless power transmission apparatus may receive, from a wireless power reception apparatus, information of a current and/or a voltage that are applied to a load of the wireless power reception apparatus when a test current and a test voltage are applied to the source resonators. The wireless power transmission apparatus may calculate the impedance parameter of the N-port network, and the power transmission efficiency, based on the received information of the current and/or the voltage.

In yet another example, the wireless power transmission apparatus may optimize the impedance parameter based on a predetermined power transmission efficiency, e.g., a desired value of the power transmission efficiency. The wireless power transmission apparatus may determine the current magnitude and/or the voltage magnitude of the power to be provided to each of the source resonators based on a result of the optimizing.

In operation 1220, the wireless power transmission apparatus provides the power to each of the source resonators. The wireless power transmission apparatus may provide the power to each of the source resonators through a feeder.

In operation 1230, the wireless power transmission apparatus transmits a power wirelessly to the wireless power reception apparatus via magnetic coupling between the target resonator and the source resonators. The wireless power transmission apparatus may adjust the voltage magnitude, the voltage phase, the current magnitude, and/or the current phase that are applied to each of the source resonators, thereby adjusting the power transmission efficiency.

In the following description, the term "resonator" used in the discussion of FIGS. 13A through 16 refers to both a source resonator and a target resonator. Resonators of FIGS. 13A through 16 may be applied to the resonators of FIGS. 1 through 12.

Figure 13A:
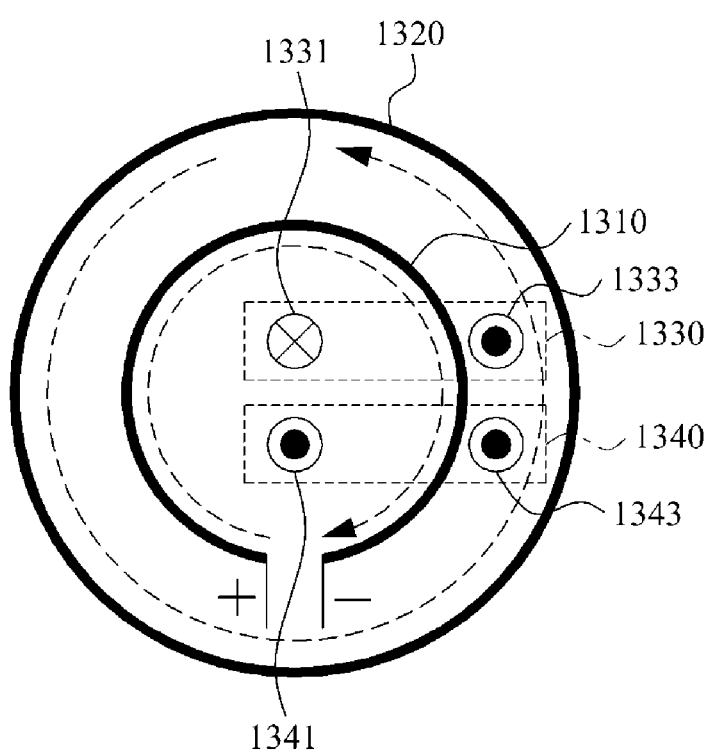
FIGS. 13A and 13B are diagrams illustrating examples of a distribution of a magnetic field in a feeder and a resonator of a wireless power transmitter.
Figure 13B:
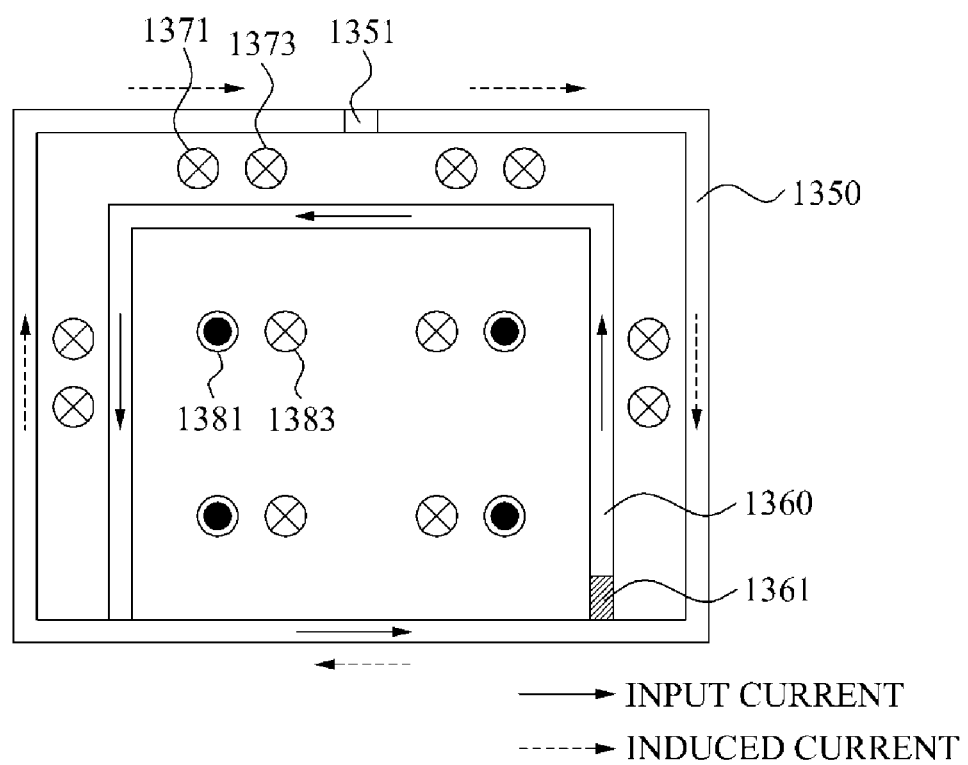

FIGS. 13A and 13B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 13A illustrates an example of a structure of a wireless power transmitter in which a feeder 1310 and a resonator 1320 do not include a common ground. Referring to FIG. 13A, as an input current flows into a feeder 1310 through a terminal labeled "+" and out of the feeder 1310 through a terminal labeled "−", a magnetic field 1330 is formed by the input current. A direction 1331 of the magnetic field 1330 inside the feeder 1310 is into the plane of FIG. 13A, and includes a phase that is opposite to a phase of a direction 1333 of the magnetic field 1330 outside the feeder 1310. The magnetic field 1330 formed by the feeder 1310 induces a current to flow in a resonator 1320. The direction of the induced current in the resonator 1320 is opposite to a direction of the input current in the feeder 1310 as indicated by the dashed arrows in FIG. 13A.

The induced current in the resonator 1320 forms a magnetic field 1340. Directions of the magnetic field 1340 are the same at all positions inside the resonator 1320. Accordingly, a direction 1341 of the magnetic field 1340 formed by the resonator 1320 inside the feeder 1310 includes the same phase as a direction 1343 of the magnetic field 1340 formed by the resonator 1320 outside the feeder 1310.

Consequently, when the magnetic field 1330 formed by the feeder 1310 and the magnetic field 1340 formed by the resonator 1320 are combined, a strength of the total magnetic field inside the resonator 1320 decreases inside the feeder 1310 and increases outside the feeder 1310. In an example in which power is supplied to the resonator 1320 through the feeder 1310 configured as illustrated in FIG. 13A, the strength of the total magnetic field decreases in the center of the resonator 1320, but increases outside the resonator 1320. In another example in which a magnetic field is randomly distributed in the resonator 1320, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 13B illustrates an example of a structure of a wireless power transmitter in which a resonator 1350 and a feeder 1360 include a common ground. The resonator 1350 includes a capacitor 1351. The feeder 1360 receives a radio frequency (RF) signal via a port 1361. When the RF signal is input to the feeder 1360, an input current is generated in the feeder 1360. The input current flowing in the feeder 1360 forms a magnetic field, and a current is induced in the resonator 1350 by the magnetic field. Additionally, another magnetic field is formed by the induced current flowing in the resonator 1350. In this example, a direction of the input current flowing in the feeder 1360 includes a phase opposite to a phase of a direction of the induced current flowing in the resonator 1350. Accordingly, in a region between the resonator 1350 and the feeder 1360, a direction 1371 of the magnetic field formed by the input current includes the same phase as a direction 1373 of the magnetic field formed by the induced current, and thus the strength of the total magnetic field increases in the region between the resonator 1350 and the feeder 1360. Conversely, inside the feeder 1360, a direction 1381 of the magnetic field formed by the input current includes a phase opposite to a phase of a direction 1383 of the magnetic field formed by the induced current, and thus the strength of the total magnetic field decreases inside the feeder 1360. Therefore, the strength of the total magnetic field decreases in the center of the resonator 1350, but increases outside the resonator 1350.

An input impedance may be adjusted by adjusting an internal area of the feeder 1360. The input impedance refers to an impedance viewed in a direction from the feeder 1360 to the resonator 1350. When the internal area of the feeder 1360 is increased, the input impedance is increased. Conversely, when the internal area of the feeder 1360 is decreased, the input impedance is decreased. Because the magnetic field is randomly distributed in the resonator 1350 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 14A:
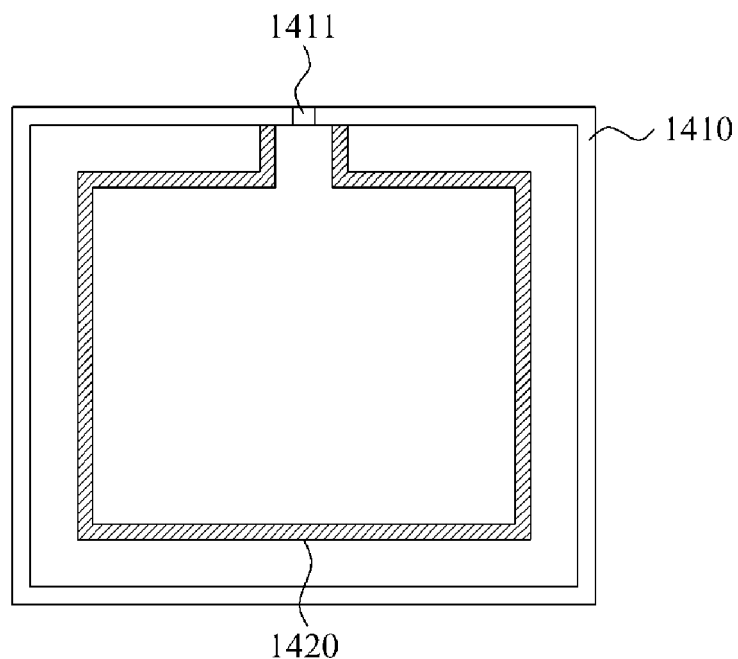
FIGS. 14A and 14B are diagrams illustrating an example of a feeding unit and a resonator of a wireless power transmitter.
Figure 14B:
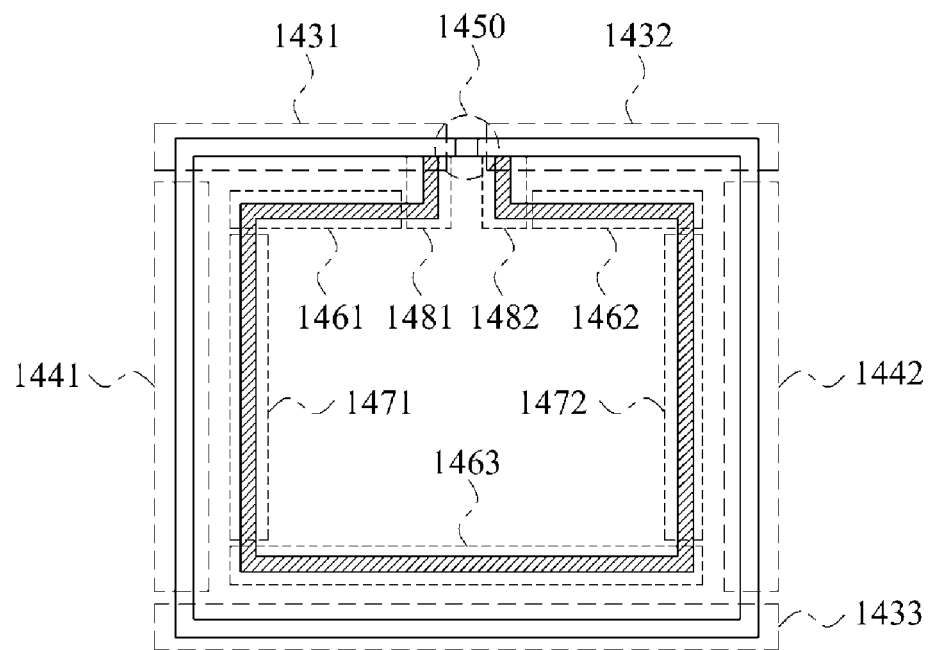

FIGS. 14A and 14B are diagrams illustrating an example of a feeding unit and a resonator of a wireless power transmitter. Referring to FIG. 14A, the wireless power transmitter includes a resonator 1410 and a feeding unit 1420. The resonator 1410 further includes a capacitor 1411. The feeding unit 1420 is electrically connected to both ends of the capacitor 1411.

FIG. 14B illustrates, in greater detail, a structure of the wireless power transmitter of FIG. 14A. The resonator 1410 includes a first transmission line (not identified by a reference numeral in FIG. 14B, but formed by various elements in FIG. 14B as discussed below), a first conductor 1441, a second conductor 1442, and at least one capacitor 1450.

The capacitor 1450 is inserted in series between a first signal conducting portion 1431 and a second signal conducting portion 1432, causing an electric field to be confined within the capacitor 1450. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 14B is separated into two portions that will be referred to as the first signal conducting portion 1431 and the second signal conducting portion 1432. A conductor disposed in a lower portion of the first transmission line in FIG. 14B will be referred to as a first ground conducting portion 1433.

As illustrated in FIG. 14B, the resonator 1410 includes a generally two-dimensional (2D) structure. The first transmission line includes the first signal conducting portion 1431 and the second signal conducting portion 1432 in the upper portion of the first transmission line, and includes the first ground conducting portion 1433 in the lower portion of the first transmission line. The first signal conducting portion 1431 and the second signal conducting portion 1432 are disposed to face the first ground conducting portion 1433. A current flows through the first signal conducting portion 1431 and the second signal conducting portion 1432.

One end of the first signal conducting portion 1431 is connected to one end of the first conductor 1441, the other end of the first signal conducting portion 1431 is connected to the capacitor 1450, and the other end of the first conductor 1441 is connected to one end of the first ground conducting portion 1433. One end of the second signal conducting portion 1432 is connected to one end of the second conductor 1442, the other end of the second signal conducting portion 1432 is connected to the other end of the capacitor 1450, and the other end of the second conductor 1442 is connected to the other end of the first ground conducting portion 1433. Accordingly, the first signal conducting portion 1431, the second signal conducting portion 1432, the first ground conducting portion 1433, the first conductor 1441, and the second conductor 1442 are connected to each other, causing the resonator 1410 to include an electrically closed loop structure. The term "loop structure" includes a polygonal structure, a circular structure, a rectangular structure, and any other geometrical structure that is closed, i.e., that does not include any opening in its perimeter. The expression "including a loop structure" indicates a structure that is electrically closed.

The capacitor 1450 is inserted into an intermediate portion of the first transmission line. In the example in FIG. 14B, the capacitor 1450 is inserted into a space between the first signal conducting portion 1431 and the second signal conducting portion 1432. The capacitor 1450 may be a lumped element capacitor, a distributed capacitor, or any other type of capacitor known to one of ordinary skill in the art. For example, a distributed element capacitor may include a zigzagged conductor line and a dielectric material including a relatively high permittivity disposed between parallel portions of the zigzagged conductor line.

The capacitor 1450 inserted into the first transmission line may cause the resonator 1410 to include a characteristic of a metamaterial. A metamaterial is a material including a predetermined electrical property that is not found in nature, and thus may include an artificially designed structure. All materials existing in nature include a magnetic permeability and permittivity. Most materials include a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that includes a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 1450 is a lumped element capacitor and a capacitance of the capacitor 1450 is appropriately determined, the resonator 1410 may include a characteristic of a metamaterial. If the resonator 1410 is caused to include a negative magnetic permeability by appropriately adjusting the capacitance of the capacitor 1450, the resonator 1410 may also be referred to as an MNG resonator. Various criteria may be applied to determine the capacitance of the capacitor 1450. For example, the various criteria may include a criterion for enabling the resonator 1410 to include the characteristic of the metamaterial, a criterion for enabling the resonator 1410 to include a negative magnetic permeability at a target frequency, a criterion for enabling the resonator 1410 to include a zeroth order resonance characteristic at the target frequency, and any other suitable criterion. Based on any one or any combination of the aforementioned criteria, the capacitance of the capacitor 1450 may be appropriately determined.

The resonator 1410, hereinafter referred to as the MNG resonator 1410, may include a zeroth order resonance characteristic of including a resonance frequency when a propagation constant is "0". If the MNG resonator 1410 includes the zeroth order resonance characteristic, the resonance frequency is independent of a physical size of the MNG resonator 1410. By changing the capacitance of the capacitor 1450, the resonance frequency of the MNG resonator 1410 may be changed without changing the physical size of the MNG resonator 1410.

In a near field, the electric field is concentrated in the capacitor 1450 inserted into the first transmission line, causing the magnetic field to become dominant in the near field. The MNG resonator 1410 includes a relatively high Q-factor when the capacitor 1450 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 14B, a magnetic core passing through the MNG resonator 1410 may be provided to increase a power transmission distance.

Referring to FIG. 14B, the feeding unit 1420 includes a second transmission line (not identified by a reference numeral in FIG. 14B, but formed by various elements in FIG. 14B as discussed below), a third conductor 1471, a fourth conductor 1472, a fifth conductor 1481, and a sixth conductor 1482.

The second transmission line includes a third signal conducting portion 1461 and a fourth signal conducting portion 1462 in an upper portion of the second transmission line, and includes a second ground conducting portion 1463 in a lower portion of the second transmission line. The third signal conducting portion 1461 and the fourth signal conducting portion 1462 are disposed to face the second ground conducting portion 1463. A current flows through the third signal conducting portion 1461 and the fourth signal conducting portion 1462.

One end of the third signal conducting portion 1461 is connected to one end of the third conductor 1471, the other end of the third signal conducting portion 1461 is connected to one end of the fifth conductor 1481, and the other end of the third conductor 1471 is connected to one end of the second ground conducting portion 1463. One end of the fourth signal conducting portion 1462 is connected to one end of the fourth conductor 1472, the other end of the fourth signal conducting portion 1462 is connected to one end the sixth conductor 1482, and the other end of the fourth conductor 1472 is connected to the other end of the second ground conducting portion 1463. The other end of the fifth conductor 1481 is connected to the first signal conducting portion 1431 at or near where the first signal conducting portion 1431 is connected to one end of the capacitor 1450, and the other end of the sixth conductor 1482 is connected to the second signal conducting portion 1432 at or near where the second signal conducting portion 1432 is connected to the other end of the capacitor 1450. Thus, the fifth conductor 1481 and the sixth conductor 1482 are connected in parallel to both ends of the capacitor 1450. The fifth conductor 1481 and the sixth conductor 1482 are used as an input port to receive an RF signal as an input.

Accordingly, the third signal conducting portion 1461, the fourth signal conducting portion 1462, the second ground conducting portion 1463, the third conductor 1471, the fourth conductor 1472, the fifth conductor 1481, the sixth conductor 1482, and the resonator 1410 are connected to each other, causing the resonator 1410 and the feeding unit 1420 to include an electrically closed loop structure. The term "loop structure" includes a polygonal structure, a circular structure, a rectangular structure, and any other geometrical structure that is closed, i.e., that does not include any opening in its perimeter. The expression "including a loop structure" indicates a structure that is electrically closed.

If an RF signal is input to the fifth conductor 1481 or the sixth conductor 1482, input current flows through the feeding unit 1420 and the resonator 1410, generating a magnetic field that induces a current in the resonator 1410. A direction of the input current flowing through the feeding unit 1420 is identical to a direction of the induced current flowing through the resonator 1410, thereby causing a strength of a total magnetic field to increase in the center of the resonator 1410, and decrease near the outer periphery of the resonator 1410.

An input impedance is determined by an area of a region between the resonator 1410 and the feeding unit 1420. Accordingly, a separate matching network used to match the input impedance to an output impedance of a power amplifier may not be necessary. However, if a matching network is used, the input impedance may be adjusted by adjusting a size of the feeding unit 1420, and accordingly a structure of the matching network may be simplified. The simplified structure of the matching network may reduce a matching loss of the matching network.

The second transmission line, the third conductor 1471, the fourth conductor 1472, the fifth conductor 1481, and the sixth conductor 1482 of the feeding unit may include a structure identical to the structure of the resonator 1410. For example, if the resonator 1410 includes a loop structure, the feeding unit 1420 may also include a loop structure. As another example, if the resonator 1410 includes a circular structure, the feeding unit 1420 may also include a circular structure.

Figure 15A:
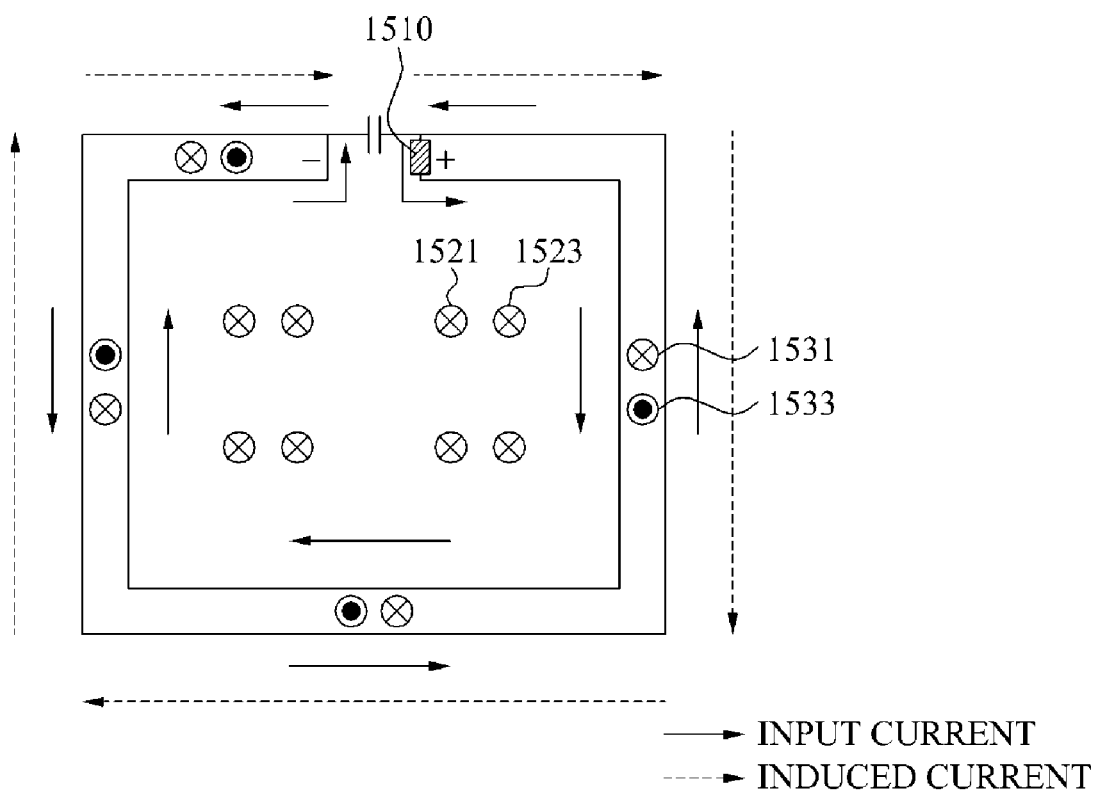
FIG. 15A is a diagram illustrating an example of a distribution of a magnetic field in a resonator that is produced by feeding of a feeding unit, of a wireless power transmitter.

FIG. 15A is a diagram illustrating an example of a distribution of a magnetic field in a resonator that is produced by feeding of a feeding unit, of a wireless power transmitter. FIG. 15A more simply illustrates the resonator 1410 and the feeding unit 1420 of FIGS. 14A and 14B, and the names of the various elements in FIG. 14B will be used in the following description of FIG. 15A without reference numerals.

A feeding operation may be an operation of supplying power to a source resonator in wireless power transmission, or an operation of supplying AC power to a rectifier in wireless power transmission. FIG. 15A illustrates a direction of input current flowing in the feeding unit, and a direction of induced current flowing in the source resonator. Additionally, FIG. 15A illustrates a direction of a magnetic field formed by the input current of the feeding unit, and a direction of a magnetic field formed by the induced current of the source resonator.

Referring to FIG. 15A, the fifth conductor or the sixth conductor of the feeding unit 1420 may be used as an input port 1510. In FIG. 15A, the sixth conductor of the feeding unit is being used as the input port 1510. An RF signal is input to the input port 1510. The RF signal may be output from a power amplifier. The power amplifier may increase and decrease an amplitude of the RF signal based on a power requirement of a target device. The RF signal input to the input port 1510 is represented in FIG. 15A as an input current flowing in the feeding unit. The input current flows in a clockwise direction in the feeding unit along the second transmission line of the feeding unit. The fifth conductor and the sixth conductor of the feeding unit are electrically connected to the resonator. The fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 15A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 15A, within the feeding unit, a direction 1521 of the magnetic field generated by the input current flowing in the feeding unit is identical to a direction 1523 of the magnetic field generated by the induced current flowing in the resonator. Accordingly, a strength of the total magnetic field may increases inside the feeding unit.

In contrast, as illustrated in FIG. 15A, in a region between the feeding unit and the resonator, a direction 1533 of the magnetic field generated by the input current flowing in the feeding unit is opposite to a direction 1531 of the magnetic field generated by the induced current flowing in the resonator. Accordingly, the strength of the total magnetic field decreases in the region between the feeding unit and the resonator.

Typically, in a resonator including a loop structure, a strength of a magnetic field decreases in the center of the resonator, and increases near an outer periphery of the resonator. However, referring to FIG. 15A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator including the loop structure, and decreases near an outer periphery of the resonator, thereby compensating for the normal characteristic of the resonator including the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 15B:
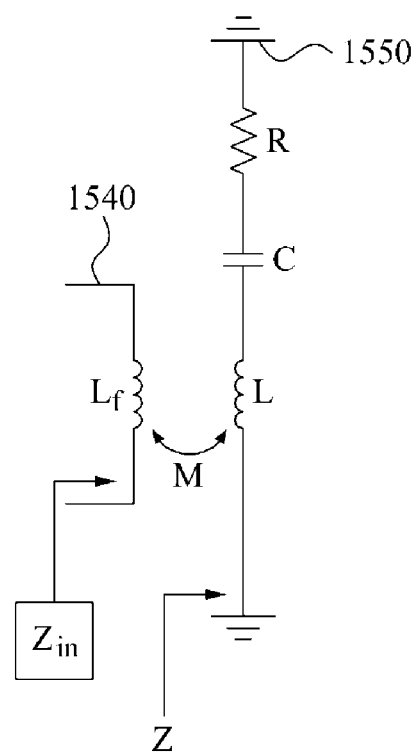
FIG. 15B is a diagram illustrating examples of equivalent circuits of a feeding unit and a resonator of a wireless power transmitter.

FIG. 15B is a diagram illustrating examples of equivalent circuits of a feeding unit and a resonator of a wireless power transmitter. Referring to FIG. 15B, a feeding unit 1540 and a resonator 1550 may be represented by the equivalent circuits in FIG. 15B. The feeding unit 1540 is represented as an inductor including an inductance $L_f$, and the resonator 1550 is represented as a series connection of an inductor including an inductance L coupled to the inductance $L_f$ of the feeding unit 1540 by a mutual inductance M, a capacitor including a capacitance C, and a resistor including a resistance R. An example of an input impedance $Z_{in}$ viewed in a direction from the feeding unit 1540 to the resonator 1550 may be expressed by the following Equation 3:

$$Z_{in} = \frac{(\omega M)^2}{Z} \quad (3)$$

In Equation 3, M denotes a mutual inductance between the feeding unit 1540 and the resonator 1550, ω denotes a resonance frequency of the feeding unit 1540 and the resonator 1550, and Z denotes an impedance viewed in a direction from the resonator 1550 to a target device. As can be seen from Equation 3, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 1540 and the resonator 1550. The area of the region between the feeding unit 1540 and the resonator 1550 may be adjusted by adjusting a size of the feeding unit 1540, thereby adjusting the mutual inductance M and the input impedance $Z_{in}$. Since the input impedance $Z_{in}$ may be adjusted by adjusting the size of the feeding unit 1540, it may be unnecessary to use a separate matching network to perform impedance matching with an output impedance of a power amplifier.

In a target resonator and a feeding unit included in a wireless power receiver, a magnetic field may be distributed as illustrated in FIG. 15A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 15A, a direction of the induced current flowing in the target resonator will be identical to a direction of the induced current flowing in the feeding unit. Accordingly, for the reasons discussed above in connection with FIG. 15A, a strength of the total magnetic field will increase inside the feeding unit, and will decrease in a region between the feeding unit and the target resonator.

Figure 16:
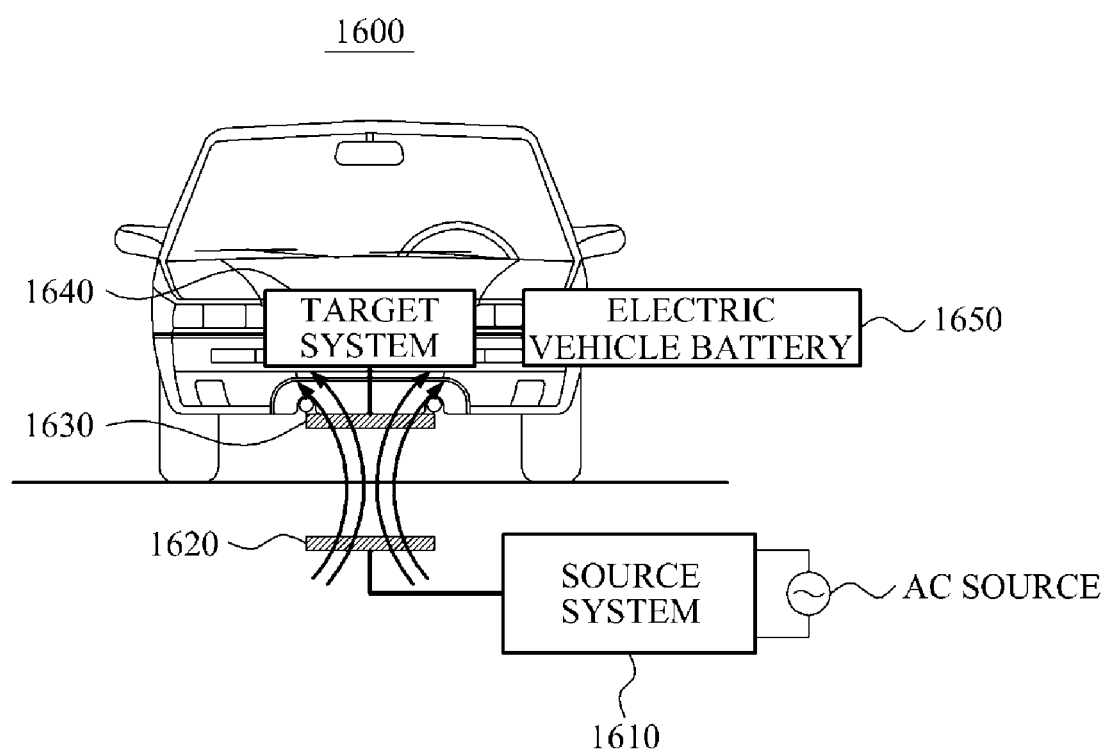
FIG. 16 is a diagram illustrating an example of an electric vehicle charging system.

FIG. 16 is a diagram illustrating an example of an electric vehicle charging system. Referring to FIG. 16, an electric vehicle charging system 1600 includes a source system 1610, a source resonator 1620, a target resonator 1630, a target system 1640, and an electric vehicle battery 1650.

In one example, the electric vehicle charging system 1600 includes a structure similar to the structure of the wireless power transmission system of FIG. 1. The source system 1610 and the source resonator 1620 in the electric vehicle charging system 1600 operate as a source. The target resonator 1630 and the target system 1640 in the electric vehicle charging system 1600 operate as a target.

In one example, the source system 1610 includes an alternating current-to-direct current (AC/DC) converter, a power detector, a power converter, a control and communication (control/communication) unit similar to those of the source device 110 of FIG. 1. In one example, the target system 1640 includes a rectifier, a DC-to-DC (DC/DC) converter, a switch, a charging unit, and a control/communication unit similar to those of the target device 120 of FIG. 1. The electric vehicle battery 1650 is charged by the target system 1640. The electric vehicle charging system 1600 may use a resonant frequency in a band of a few kHz to tens of MHz.

The source system 1610 generates power based on a type of the vehicle being charged, a capacity of the electric vehicle battery 1650, and a charging state of the electric vehicle battery 1650, and wirelessly transmits the generated power to the target system 1640 via a magnetic coupling between the source resonator 1620 and the target resonator 1630.

The source system 1610 may control an alignment of the source resonator 1620 and the target resonator 1630. For example, when the source resonator 1620 and the target resonator 1630 are not aligned, the controller of the source system 1610 may transmit a message to the target system 1640 to control the alignment of the source resonator 1620 and the target resonator 1630.

For example, when the target resonator 1630 is not located in a position enabling maximum magnetic coupling, the source resonator 1620 and the target resonator 1630 are not properly aligned. When a vehicle does not stop at a proper position to accurately align the source resonator 1620 and the target resonator 1630, the source system 1610 may instruct a position of the vehicle to be adjusted to control the source resonator 1620 and the target resonator 1630 to be aligned. However, this is just an example, and other methods of aligning the source resonator 1620 and the target resonator 1630 may be used.

The source system 1610 and the target system 1640 may transmit or receive an ID of a vehicle and exchange various messages by performing communication with each other.

The descriptions of FIGS. 1 through 15B are also applicable to the electric vehicle charging system 1600. However, the electric vehicle charging system 1600 may use a resonant frequency in a band of a few kHz to tens of MHz, and may wirelessly transmit power that is equal to or higher than tens of watts to charge the electric vehicle battery 1650.

The examples of a wireless power transmission apparatus described may adjust a current magnitude, a current phase, a voltage magnitude, and/or a voltage phase of a power to be provided to a resonator, thereby maintaining an optimal power transmission efficiency in view of various environments, for example, a number of devices to be charged, a location of a device to be charged, a distance between a source resonator and a target resonator, and/or a change in a location. Accordingly, the wireless power transmission apparatus may control a magnetic field formed in the resonator.

The wireless power transmission apparatus may be applied to an example in which a source device or a target device is movable. For example, if a source resonator and a target resonator are not aligned while an electric vehicle is being charged wirelessly, a power transmission efficiency may be maintained. The wireless power transmission apparatus may adjust the current magnitude, the current phase, the voltage magnitude, and/or the voltage phase of the power to be provided to the resonator, thereby reducing a number of matching networks.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus comprising:
   resonators configured to wirelessly transmit first power to a wireless power reception apparatus;
   a controller configured to control at least one from among a current magnitude and a voltage magnitude of second power to be provided to at least one of the resonators; and
   a power feeding circuit configured to provide the second power to the at least one of the resonators,
   wherein the controller is further configured to:
      obtain at least one from among a distance, a direction and an angle between the wireless power transmission apparatus and the wireless power reception apparatus in a wireless charging area of the wireless power transmission apparatus;
      adjust the at least one from among the current magnitude and the voltage magnitude of the second power based on the at least one of the distance, the direction or the angle between the wireless power transmission apparatus and the wireless power reception apparatus;
      identify an impedance of an N-port network between a target resonator of the wireless power reception apparatus connected to the N-port network and each of the resonators connected to the N-port network; and
      control the at least one from among the current magnitude and the voltage magnitude of the second power further based on the impedance.

2. The apparatus of claim 1, wherein the controller is further configured to:
   obtain a number of wireless power reception apparatuses to be charged in the wireless charging area; and
   adjust the at least one from among the current magnitude and the voltage magnitude of the second power further based on the number of wireless power reception apparatuses to be charged.

3. The apparatus of claim 1, wherein the controller is further configured to:

obtain information on a change in a location of wireless power reception apparatus in the wireless charging area; and adjust the at least one from among the current magnitude and the voltage magnitude of the second power further based on the information on the change in the location of wireless power reception apparatus.

4. The apparatus of claim 1, wherein the resonators are coupled to each other, or separated from each other, and wherein the power feeding circuit comprises an inductor.

5. The apparatus of claim 1, wherein the controller is further configured to:

change the at least one from among the current magnitude and the voltage magnitude sequentially in a range of a predetermined current magnitude and/or the and a predetermined voltage magnitude that are applicable by the power feeding circuit.

6. The apparatus of claim 1, wherein the controller is further configured to:

change the at least one from among the current magnitude and the voltage magnitude randomly in a range of a predetermined current magnitude and a predetermined voltage magnitude that is applicable by the power feeding circuit.

7. The apparatus of claim 1, wherein the controller is further configured to:

change the at least one from among the current magnitude and the voltage magnitude based on a lookup table in a range of a predetermined current magnitude and a predetermined voltage magnitude that are applicable by the power feeding circuit.

8. The apparatus of claim 1, wherein each of the resonators comprises:

a first transmission line comprising a first signal conducting portion, a second signal conducting portion, and a first ground conducting portion corresponding to the first signal conducting portion and the second signal conducting portion;

a first conductor connected to the first signal conducting portion and the first ground conducting portion;

a second conductor connected to the second signal conducting portion; and a capacitor inserted in series between the first signal conducting portion and the second signal conducting portion with respect to a current flowing through the first signal conducting portion and the second signal conducting portion.

9. The apparatus of claim 1, wherein the resonators comprises:

a first resonator comprising a surface parallel to an xy plane;

a second resonator comprising a surface parallel to a yz plane; and a third resonator comprising a surface parallel to a zx plane.

10. A wireless power transmission apparatus comprising:

resonators configured to wirelessly transmit first power to a wireless power reception apparatus;

a controller configured to control at least one from among a current phase and a voltage phase of the power to be provided to at least one of the resonators; and a power feeding circuit configured to provide the second power to the at least one of the resonators, wherein the controller is further configured to:

obtain at least one from among a distance, a direction and an angle between the wireless power transmission apparatus and the wireless power reception apparatus in a wireless charging area of the wireless power transmission apparatus;

adjust the at least one from among the current phase and the voltage phase of the second power based on at least one of the distance, the direction or the angle between the wireless power transmission apparatus and the wireless power reception apparatus;

identify an impedance of an N-port network between a target resonator of the wireless power reception apparatus connected to the N-port network and each of the resonators connected to the N-port network; and control the at least one from among the current phase and the voltage phase of the second power further based on the impedance.

11. The apparatus of claim 10, wherein the controller is further configured to:

obtain a number of wireless power reception apparatuses to be charged in the wireless charging area; and adjust the at least one from among the current phase and the voltage phase of the second power further based on the number of wireless power reception apparatuses to be charged.

12. The apparatus of claim 10, wherein the controller is further configured to:

obtain information on a change in a location of wireless power reception apparatus in the wireless charging area; and adjust the at least one from among the current phase and the voltage phase of the second power further based on the information on the change in the location of wireless power reception apparatus.

13. The apparatus of claim 10, wherein the resonators comprises:

a first resonator comprising a surface parallel to an xy plane;

a second resonator comprising a surface parallel to a yz plane; and a third resonator comprising a surface parallel to a zx plane.

14. A method for operating a wireless power transmission apparatus, the wireless power transmission apparatus comprising resonators to wirelessly transmit first power to a wireless power reception apparatus and a power feeding circuit to provide second power to at least one of the resonators, the method comprising:

controlling at least one from among a current magnitude, a current phase, a voltage magnitude and a voltage phase of the second power to be provided to the at least one of the resonators, wherein the controlling comprises:

obtaining at least one from among a distance, a direction and an angle between the wireless power transmission apparatus and the wireless power reception apparatus in a wireless charging area of the wireless power transmission apparatus;

adjusting the at least one from among the current magnitude, the current phase, the voltage magnitude and the voltage phase of the second power based on the at least one of the distance, the direction or the angle between the wireless power transmission apparatus and the wireless power reception apparatus;

identifying an impedance of an N-port network between a target resonator of the wireless power reception apparatus connected to the N-port network and each of the resonators connected to the N-port network; and controlling the at least one from among the current magnitude and the voltage magnitude of the second power further based on the impedance.

15. The method of claim 14, wherein the controlling further comprises:
obtaining a number of wireless power reception apparatuses to be charged in the wireless charging area, and
wherein the adjusting comprises:
adjusting the at least one from among the current magnitude, the current phase, the voltage magnitude and the voltage phase of the second power based on the number of wireless power reception apparatuses to be charged and the at least one of the distance, the direction or the angle between the wireless power transmission apparatus and the wireless power reception apparatus.

16. The method of claim 14, wherein the controlling further comprises:
obtaining information on a change in a location of wireless power reception apparatus in the wireless charging area, and
wherein the adjusting comprises:
adjusting the at least one from among the current magnitude, the current phase, the voltage magnitude and the voltage phase of the second power based on the information on the change in the location of wireless power reception apparatus and the at least one of the distance, the direction or the angle between the wireless power transmission apparatus and the wireless power reception apparatus.

17. The method of claim 14, wherein the controlling further comprises:
calculating an impedance of an N-port network between the other resonator connected the N-port network and the resonators connected to the N-port network, and
wherein the adjusting comprises:
adjusting the at least one from among the current magnitude, the current phase, the voltage magnitude and the voltage phase of the second power based on the impedance and the at least one of the distance, the direction or the angle between the wireless power transmission apparatus and the wireless power reception apparatus.

18. A non-transitory computer-readable recording medium storing a program to implement a method of claim 14.

* * * * *